United States Patent
O'Hare et al.

(10) Patent No.: US 12,008,131 B2
(45) Date of Patent: *Jun. 11, 2024

(54) SYSTEMS AND METHODS FOR A CRYPTOGRAPHIC FILE SYSTEM LAYER

(71) Applicant: Security First Innovations, LLC, Ashburn, VA (US)

(72) Inventors: Mark S. O'Hare, Coto De Caza, CA (US); Rick L Orsini, Flower Mound, TX (US); Roger S. Davenport, Campbell, TX (US)

(73) Assignee: Security First Innovations, LLC, Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,212

(22) Filed: Jan. 19, 2023

(65) Prior Publication Data
US 2023/0161897 A1 May 25, 2023

Related U.S. Application Data

(63) Continuation of application No. 16/556,909, filed on Aug. 30, 2019, now Pat. No. 11,586,757, which is a
(Continued)

(51) Int. Cl.
*G06F 21/62* (2013.01)
*H04L 9/08* (2006.01)
(Continued)

(52) U.S. Cl.
CPC ...... *G06F 21/6227* (2013.01); *G06F 21/6218* (2013.01); *H04L 9/085* (2013.01);
(Continued)

(58) Field of Classification Search
CPC ... G06F 21/6227; G06F 21/6218; H04L 9/085
See application file for complete search history.

(56) References Cited

U.S. PATENT DOCUMENTS

| | | | |
|---|---|---|---|
| 4,067,058 | A | 1/1978 | Brandstaetter et al. |
| 4,238,853 | A | 12/1980 | Ehrsam et al. |

(Continued)

FOREIGN PATENT DOCUMENTS

| | | |
|---|---|---|
| DE | 19740333 | 3/1999 |
| EP | 1063811 | 12/2000 |

(Continued)

OTHER PUBLICATIONS

Atul Adya, William J. Bolosky, Miguel Castro, Ronnie Chaiken, Gerald Cermak, John R. Douceur, Jon Howell, Jacob R. Lorch, Marvin Theimer, Roger P. Wattenhofer "FARSITE: Federated, available, and Reliable Storage for an Incompletely Trusted Environment" OSDI '02 5$^{th}$ Symposium on Operating Systems Design and Implementation Dec. 9-11, 2002 14 Pgs.

(Continued)

*Primary Examiner* — Oleg Korsak
(74) *Attorney, Agent, or Firm* — Farjami & Farjami LLP

(57) ABSTRACT

The systems and methods disclosed herein transparently provide data security using a cryptographic file system layer that selectively intercepts and modifies (e.g., by encrypting) data to be stored in a designated directory. The cryptographic file system layer can be used in combination with one or more cryptographic approaches to provide a server-based secure data solution that makes data more secure and accessible, while eliminating the need for multiple perimeter hardware and software technologies.

20 Claims, 18 Drawing Sheets

Related U.S. Application Data continuation of application No. 15/882,694, filed on Jan. 29, 2018, now Pat. No. 10,402,582, which is a continuation of application No. 14/180,151, filed on Feb. 13, 2014, now Pat. No. 9,881,177.

(60) Provisional application No. 61/764,532, filed on Feb. 13, 2013.

(51) Int. Cl.
  *H04L 9/06* (2006.01)
  *H04L 9/32* (2006.01)
(52) U.S. Cl.
  CPC ............ *H04L 9/065* (2013.01); *H04L 9/3226* (2013.01); *H04L 9/3234* (2013.01)

(56) References Cited

U.S. PATENT DOCUMENTS

| | | |
|---|---|---|
| 5,412,722 A | 5/1995 | Sherly et al. |
| 5,416,841 A | 5/1995 | Merrick |
| 5,483,598 A | 1/1996 | Kaufman et al. |
| 5,526,507 A | 6/1996 | Hill |
| 5,675,653 A | 10/1997 | Nelson, Jr. |
| 5,706,513 A | 1/1998 | Bahls et al. |
| 5,812,671 A | 9/1998 | Ross, Jr. |
| 5,825,890 A | 10/1998 | Elgamal et al. |
| 5,963,646 A | 10/1999 | Fielder et al. |
| 5,966,448 A | 10/1999 | Namba et al. |
| 5,991,414 A | 11/1999 | Garay et al. |
| 5,991,753 A | 11/1999 | Wilde |
| 6,021,391 A | 2/2000 | Shyu |
| 6,065,096 A | 5/2000 | Day et al. |
| 6,084,968 A | 7/2000 | Kennedy et al. |
| 6,088,454 A | 7/2000 | Nagashima et al. |
| 6,151,659 A | 11/2000 | Solomon et al. |
| 6,219,420 B1 | 4/2001 | Hardy et al. |
| 6,233,606 B1 | 5/2001 | Dujari |
| 6,308,277 B1 | 10/2001 | Vaeth et al. |
| 6,324,648 B1 | 11/2001 | Grantges |
| 6,345,101 B1 | 2/2002 | Shukla |
| 6,356,915 B1 | 3/2002 | Chtchetkine et al. |
| 6,363,481 B1 | 3/2002 | Hardjono |
| 6,393,568 B1 | 5/2002 | Ranger et al. |
| 6,427,212 B1 | 6/2002 | Frey |
| 6,490,353 B1 | 12/2002 | Tan |
| 6,557,734 B2 | 5/2003 | Buazza et al. |
| 6,577,734 B1 | 6/2003 | Etzel et al. |
| 6,584,564 B2 | 6/2003 | Olkin et al. |
| 6,598,161 B1 | 7/2003 | Kluttz et al. |
| 6,697,846 B1 | 2/2004 | Soltis |
| 6,819,766 B1 | 11/2004 | Weidong |
| 6,868,160 B1 | 3/2005 | Raji |
| 6,947,556 B1 | 9/2005 | Matywas et al. |
| 6,973,455 B1 | 12/2005 | Vahalia et al. |
| 6,981,141 B1 | 12/2005 | Mahne et al. |
| 6,993,701 B2 | 1/2006 | Corbett et al. |
| 7,043,614 B2 | 5/2006 | Umbehocker et al. |
| 7,043,637 B2 | 5/2006 | Bolosky et al. |
| 7,047,420 B2 | 5/2006 | Douceur et al. |
| 7,092,524 B1 | 8/2006 | Timmel |
| 7,099,994 B2 | 8/2006 | Thayer et al. |
| 7,165,050 B2 | 1/2007 | Marking |
| 7,178,033 B1 | 2/2007 | Garcia |
| 7,185,144 B2 | 2/2007 | Corbett et al. |
| 7,187,771 B1 | 3/2007 | Dickinson et al. |
| 7,200,747 B2 | 4/2007 | Riedel et al. |
| 7,203,844 B1 | 4/2007 | Oxford |
| 7,237,062 B2 | 6/2007 | Lubbers et al. |
| 7,251,828 B1 | 7/2007 | Hamid et al. |
| 7,277,941 B2 | 10/2007 | Ignatius et al. |
| 7,315,923 B2 | 1/2008 | Retnamma et al. |
| 7,328,305 B2 | 2/2008 | Kleiman et al. |
| 7,337,331 B2 | 2/2008 | Yoshida |
| 7,350,101 B1 | 3/2008 | Nguyen et al. |
| 7,373,364 B1 | 5/2008 | Chapman |
| 7,383,462 B2 | 6/2008 | Osaki et al. |
| 7,415,115 B2 | 8/2008 | Ma |
| 7,437,429 B2 | 10/2008 | Pardikar et al. |
| 7,437,472 B2 | 10/2008 | Rose |
| 7,484,245 B1 | 1/2009 | Friedman et al. |
| 7,529,834 B1 | 5/2009 | Birrell et al. |
| 7,571,320 B2 | 8/2009 | Davis |
| 7,634,650 B1 | 12/2009 | Shah et al. |
| 7,636,724 B2 | 12/2009 | De la Torre et al. |
| 7,681,104 B1 | 3/2010 | Sim-Tang et al. |
| 7,685,126 B2 | 3/2010 | Patel et al. |
| 7,689,829 B2 | 3/2010 | Birkhoelzer et al. |
| 7,739,577 B2 | 6/2010 | Earhart et al. |
| 7,885,405 B1 | 2/2011 | Bong |
| 7,941,695 B2 | 5/2011 | Soran et al. |
| 8,009,830 B2 | 8/2011 | Orsini et al. |
| 8,027,958 B1 | 9/2011 | Chapman |
| 8,078,869 B2 | 12/2011 | Adams et al. |
| 8,320,560 B2 | 11/2012 | Orsini et al. |
| 8,352,518 B2 | 1/2013 | Kazar et al. |
| 8,516,211 B2 | 8/2013 | Wyles |
| 8,601,134 B1 | 12/2013 | Sorenson et al. |
| 8,644,502 B2 | 2/2014 | Orsini et al. |
| 8,707,034 B1 | 4/2014 | Ryan |
| 8,788,803 B2 | 7/2014 | Irvine |
| 9,021,087 B1 | 4/2015 | Weng et al. |
| 9,135,119 B1 | 9/2015 | Natanzon et al. |
| 9,191,200 B1 | 11/2015 | Adams |
| 9,317,705 B2 | 4/2016 | O'Hare et al. |
| 9,338,140 B2 | 5/2016 | O'Hare et al. |
| 9,673,975 B1 | 6/2017 | Machani |
| 10,108,807 B2 | 10/2018 | O'Hare et al. |
| 10,372,554 B1 | 8/2019 | Natanzon et al. |
| 10,452,854 B2 | 10/2019 | O'Hare |
| 10,657,283 B2 | 5/2020 | Eigner et al. |
| 10,721,062 B2 | 7/2020 | Chen |
| 11,068,609 B2 | 7/2021 | O'Hare |
| 11,586,757 B2 * | 2/2023 | O'Hare .................. H04L 9/085 |
| 2001/0037474 A1 | 11/2001 | Steegmans |
| 2001/0053221 A1 | 12/2001 | Takeda |
| 2002/0019908 A1 | 2/2002 | Reuter et al. |
| 2002/0019932 A1 | 2/2002 | Toh et al. |
| 2002/0042859 A1 | 4/2002 | Lowry |
| 2002/0088011 A1 | 7/2002 | Lamkin et al. |
| 2002/0095590 A1 | 7/2002 | Douceur et al. |
| 2002/0116622 A1 | 8/2002 | Okaue et al. |
| 2002/0126850 A1 | 9/2002 | Allen et al. |
| 2002/0162047 A1 | 10/2002 | Peters et al. |
| 2002/0169808 A1 | 11/2002 | Fromm |
| 2002/0169842 A1 | 11/2002 | Christensen et al. |
| 2002/0174010 A1 | 11/2002 | Rice |
| 2002/0174295 A1 | 11/2002 | Ulrich et al. |
| 2002/0194209 A1 | 12/2002 | Bolosky et al. |
| 2002/0199099 A1 | 12/2002 | Shirai et al. |
| 2003/0012386 A1 | 1/2003 | Kim et al. |
| 2003/0016820 A1 | 1/2003 | Volpert, Jr. |
| 2003/0028493 A1 | 2/2003 | Tajima et al. |
| 2003/0044020 A1 | 3/2003 | Aboba et al. |
| 2003/0046366 A1 | 3/2003 | Pardikar et al. |
| 2003/0046533 A1 | 3/2003 | Olkin et al. |
| 2003/0081784 A1 | 5/2003 | Kallahalla et al. |
| 2003/0081790 A1 | 5/2003 | Riedel et al. |
| 2003/0105719 A1 | 6/2003 | Berger et al. |
| 2003/0108204 A1 | 6/2003 | Audebert et al. |
| 2003/0110188 A1 | 6/2003 | Howard et al. |
| 2003/0167314 A1 | 9/2003 | Gilbert et al. |
| 2003/0167408 A1 | 9/2003 | Fitzpatrick et al. |
| 2003/0182435 A1 | 9/2003 | Redlich et al. |
| 2003/0188153 A1 | 10/2003 | Demoff et al. |
| 2003/0191938 A1 | 10/2003 | Woods et al. |
| 2003/0200176 A1 | 10/2003 | Foster et al. |
| 2004/0003272 A1 | 1/2004 | Bantz et al. |
| 2004/0005061 A1 | 1/2004 | Buer et al. |
| 2004/0030921 A1 | 2/2004 | Aldrige et al. |
| 2004/0039925 A1 | 2/2004 | McMillan et al. |
| 2004/0049687 A1 | 3/2004 | Orsini et al. |
| 2004/0049700 A1 | 3/2004 | Yoshida |
| 2004/0122863 A1 | 6/2004 | Sidman |

(56) References Cited

U.S. PATENT DOCUMENTS

| | | |
|---|---|---|
| 2004/0139024 A1 | 7/2004 | So |
| 2004/0143733 A1 | 7/2004 | Ophir et al. |
| 2004/0172476 A1 | 9/2004 | Chapweske |
| 2004/0177257 A1 | 9/2004 | Fujinawa et al. |
| 2004/0216164 A1 | 10/2004 | Hayhurst |
| 2004/0228479 A1 | 11/2004 | Crispin et al. |
| 2005/0065888 A1 | 3/2005 | Benaloh |
| 2005/0120065 A1 | 6/2005 | Dirscherl et al. |
| 2005/0177740 A1 | 8/2005 | Athaide et al. |
| 2005/0198490 A1 | 9/2005 | Jaganathan et al. |
| 2005/0210269 A1 | 9/2005 | Tiberg |
| 2005/0216754 A1 | 9/2005 | Ehud |
| 2005/0240749 A1 | 10/2005 | Clemo et al. |
| 2005/0256972 A1 | 11/2005 | Cochran et al. |
| 2005/0273858 A1 | 12/2005 | Zadok et al. |
| 2006/0034457 A1 | 2/2006 | Damgaard et al. |
| 2006/0053112 A1 | 3/2006 | Chitkara et al. |
| 2006/0053308 A1 | 3/2006 | Zimmerman |
| 2006/0059347 A1 | 3/2006 | Herz et al. |
| 2006/0062384 A1 | 3/2006 | Dondeti |
| 2006/0064383 A1 | 3/2006 | Marking |
| 2006/0064386 A1 | 3/2006 | Marking |
| 2006/0080574 A1 | 4/2006 | Saito et al. |
| 2006/0200677 A1 | 9/2006 | Marinescu |
| 2006/0206889 A1 | 9/2006 | Ganesan et al. |
| 2007/0006015 A1 | 1/2007 | Rao et al. |
| 2007/0033149 A1 | 2/2007 | Kanngard et al. |
| 2007/0088669 A1 | 4/2007 | Jaschek et al. |
| 2007/0113078 A1 | 5/2007 | Witt et al. |
| 2007/0160198 A1 | 7/2007 | Orsini et al. |
| 2007/0180233 A1 | 8/2007 | Matsushita et al. |
| 2007/0266066 A1 | 11/2007 | Kapoor et al. |
| 2009/0177894 A1 | 7/2009 | Orsini et al. |
| 2009/0323958 A1 | 12/2009 | Schneider et al. |
| 2010/0005318 A1 | 1/2010 | Hosain |
| 2010/0150341 A1 | 6/2010 | Dodgson et al. |
| 2010/0162001 A1 | 6/2010 | Dodgson |
| 2010/0169661 A1* | 7/2010 | Summers ............... G06F 21/80 710/52 |
| 2010/0268966 A1 | 10/2010 | Leggette et al. |
| 2010/0318812 A1 | 12/2010 | Auradkar et al. |
| 2011/0176675 A1 | 7/2011 | Hughes |
| 2011/0197068 A1 | 8/2011 | Holden et al. |
| 2011/0295967 A1 | 12/2011 | Wang et al. |
| 2012/0047339 A1 | 2/2012 | Decasper et al. |
| 2012/0167117 A1 | 6/2012 | Kekeh et al. |
| 2012/0233293 A1 | 9/2012 | Barton et al. |
| 2012/0243687 A1 | 9/2012 | Li |
| 2013/0054530 A1 | 2/2013 | Baker et al. |
| 2013/0340067 A1 | 12/2013 | Lindteigen |
| 2014/0258715 A1* | 9/2014 | Rodniansky ........ G06F 21/6227 713/162 |
| 2014/0330784 A1 | 11/2014 | Sundaram et al. |
| 2017/0364688 A1* | 12/2017 | Desai .................. G06F 21/602 |
| 2018/0278419 A1* | 9/2018 | Higgins .............. H04L 63/0428 |
| 2018/0329834 A1 | 11/2018 | Grube |
| 2018/0367509 A1 | 12/2018 | O'Hare et al. |
| 2019/0377889 A1 | 12/2019 | Mertens |
| 2023/0090972 A1* | 3/2023 | Rezaei ................. H04L 9/3226 713/171 |

FOREIGN PATENT DOCUMENTS

| | | |
|---|---|---|
| EP | 1394680 | 3/2004 |
| JP | 2001155007 | 6/2001 |
| WO | 99/38302 | 7/1999 |
| WO | 01/15162 | 3/2001 |
| WO | 01/22319 | 3/2001 |
| WO | 01/22322 | 3/2001 |
| WO | 2002281021 | 9/2002 |
| WO | 2003348065 | 12/2003 |
| WO | 2004008289 | 1/2004 |
| WO | 2004/057461 | 7/2004 |
| WO | 2005/024686 | 3/2005 |
| WO | WO 2012/023929 | 2/2012 |

OTHER PUBLICATIONS

Christopher Batten, Kenneth Barr, Arvind Saraf, Stanley Trepetin "pStore: A Secure Peer-to- Peer Backup System" NOTERE '08: Proceedings of the 8$^{th}$ International Conference on New Technologies in Distributed Systems Jun. 2008 12 Pgs.

Ian Clarke, Scott G. Miller, Theodore W. Hong, Oskar Sandberg and Brandon Wiley "Protecting Free Expression Online with Freenet" IEEE Internet Computing vol. 6, Issue 1, Jan.-Feb. 2002 10 Pgs.

Roger Dingledine, Michael J. Freedman, David Molnar "The Free Haven Project: Distributed Anonymous Storage Service" International Workshop on Designing Privacy Enhancing Technologies: Design Issues in Anonymity and Unobservability Dec. 17, 2000 23 Pgs.

Gregory R. Ganger, Pradeep K. Khosla, Mehmet Bakka;oglu, Michael W. Bigrigg, Garth R. Goodson, Semih Oguz, Vijay Pandurangan, Craig A. N. Soules, John D. Strunk, Jay J. Wylie "Survivable Storage Systems" Proceedings DARPA Information Survivability Conference and Exposition II DISCEX'01 Jun. 12-14, 2001 12 Pgs.

Sanjay Ghemawat, Howard Gobioff, and Shun-Tak Leung "The Google File System" SOSP'03 Oct. 1-22, 2003 15 Pgs.

Mahesh Kallahalla, Erik Riedel, Ram Swaminathan, Qian Wang, Kevin Fu "Plutus: Scalable Secure File Sharing on Untrusted Storage" Proceedings of the 2$^{nd}$ USENIX Conference on File and Storage Technologies, Mar. 31-Apr. 2, 2003 22 Pgs.

Gopalan Sivathanu, Charles P. Wright and Erez Zadok "Ensuring Data Integrity in Storage: Techniques and Applications" StorageSS'05, Nov. 11, 2005 11 Pgs.

Paul Stanton "Securing Data in Storage: A Review of Current Research" ArXiv 2004 22 Pgs.

Security First Innovation's Aug. 14, 2023 Infringement Contentions, Chart A in Security First Innovations, LLC v. Google LLC, 2-23-cv-00097 (E.D. Va.).

Security First Innovation's Aug. 14, 2023 Infringement Contentions, Chart C in Security First Innovations, LLC v. Google LLC, 2-23-cv-00097 (E.D. Va.).

R. L. Rivest, "All-or-nothing encryption and the package transform," Proc. Of the 4th Intl. Workshop on Fast Software Encryption 1997, (E. Biham, ed.), Lecture Notes in Computer Science, 1267 (1997) pp. 210-218.

Security First Innovation's Aug. 14, 2023 Infringement Contentions, Chart D in Security First Innovations, LLC v. Google LLC, 2-23-cv-00097 (E.D. Va.).

ABS: The Apportioned Backup System, Cooley et al., Published 2004.

Google LLC's Proposed Claim Terms for Construction in Security First Innovations, LLC v. Google, LLC, 2:23-cv-00097-JWK-RJK (Nov. 11, 2023).

Letter from A. Mayron to D. Perlson re Preliminary Proposed Constructions in Security First Innovations, LLC v. Google, LLC, 2:23-cv-00097-JWK-RJK (Nov. 11, 2023).

File History of IPR2024-00212, filed on Nov. 24, 2023.

IPR2024-00212: Petition for Inter Partes Review of U.S. Pat. No. 11,178,116, filed on Nov. 24, 2023.

File History of IPR2024-00214, filed on Nov. 24, 2023.

IPR2024-00214: Petition for Inter Partes Review of U.S. Pat. No. 11,068,609, filed on Nov. 24, 2023.

File History of IPR2024-00215, filed on Nov. 24, 2023.

IPR2024-00215: Petition for Inter Partes Review of U.S. Pat. No. 10,452,854, filed on Nov. 24, 2023.

File History of IPR2024-00213, filed on Nov. 27, 2023.

IPR2024-00213: Petition for Inter Partes Review of U.S. Pat. No. 9,338,140, filed on Nov. 27, 2023.

"ABS: The Apportioned Backup System" by Joe Cooley et al. in 2004, "All-Or-Nothing Encryption and The Package Transform" by Ronald L. Rivest in Jan. 20, 1997.

(56) References Cited

OTHER PUBLICATIONS

"An Introduction to Cryptography" by PGP Corporation in Oct. 2002.
"Chord: A Scalable Peer-to-peer Lookup Service for Internet Applications" by Ion Stoica et al. in 2001.
"Efficient Sharing of Encrypted Data" by Krista Bennett et al. in 2002.
"FARSITE: Federated, available and Reliable Storage for an Incompletely Trusted Environment" by Atul Adya et al. in 2002.
"File-Based Network Collaboration System" by Toshinari Takahashi et al. in 1995.
"How to Build a Trusted Database System on Untrusted Storage" by Umesh Maheshwari et al. in 2002.
"Information Security on the Logistical Network: An End-to-End Approach" by Micah Beck et al. in 2003.
"Pastiche: Making Backup Cheal and Easy" by Boon Thau Loo in 2023.
"Plubius: A robust, tamper-evident, censorship-resistant web publishing system" by Marc Waldman et al. in 2000.
"Plutus: Scalable secure file sharing on untrusted storage" by Mahesh Kallahalla et al. in 2003.
"pStore: A Secure Peer-to-Peer Backup System" by Christopher Batten et al. in 2001.
"Secured distributed storage and retrieval" by Juan A. Garay et al. in 2000.
"Step-by-Step Guide to Encrypting File System (EFS)" by Microsoft Corporation on Apr. 6, 2004.
"Strong Security for Network-Attached Storage" by Ethan L. Miller et al. on Jan. 28, 2002.
"The Free Haven Project: Distributed Anonymous Storage Service" by Roger Dingledine et al. on Dec. 17, 2000.
"Windows Encryption EFS or PGP" by Anthony D. Ombrellaro on Apr. 24, 2003.
File History of U.S. Appl. No. 17/347,268 (O'Hare et al.), filed Jun. 14, 2021.
File History of U.S. Appl. No. 17/567,161 (O'Hare et al.), filed Jan. 3, 2022.
File History of U.S. Appl. No. 17/531,645 (O'Hare et al.), filed Nov. 19, 2021.
File History of U.S. Appl. No. 17/111,262 (O'Hare et al.), filed Dec. 3, 2020.
File History of U.S. Pat. No. 11,586,757 (O'Hare et al.), Issued Feb. 21, 2023.
File History of U.S. Appl. No. 18/131,229 (O'Hare et al.), filed Apr. 5, 2023.
File History of U.S. Appl. No. 18/229,122 (O'Hare et al.), filed Aug. 1, 2023.

* cited by examiner

FIG. 6 *(Prior Art)*

Application Layer

Cryptographic File System Layer

File System Layer

File System

FIG. 13

SYSTEMS AND METHODS FOR A CRYPTOGRAPHIC FILE SYSTEM LAYER

CROSS-REFERENCE TO RELATED APPLICATION

This application is a continuation of U.S. patent application Ser. No. 16/556,909, filed Aug. 30, 2019, which is a continuation of U.S. patent application Ser. No. 15/882,694, filed Jan. 29, 2018, now U.S. Pat. No. 10,402,582, which is a continuation of U.S. patent application Ser. No. 14/180,151, filed Feb. 13, 2014, now U.S. Pat. No. 9,881,177, which claims priority to U.S. Provisional Application No. 61/764,532, filed Feb. 13, 2013, the contents of which are hereby incorporated by reference herein in their entirety.

SUMMARY

A cryptographic file system layer includes a software or firmware layer for intercepting data to be stored on a file system and modifying at least some of the intercepted data, e.g., by securing data being stored in the file system, or restoring secured data retrieved from the file system. Generally, the cryptographic file system layer intercepts data passing between the application layer and the file system and modifies only data that is located in one or more designated directories.

According to one aspect, the systems and methods disclosed herein transparently provide data security using a cryptographic file system layer that selectively intercepts and modifies (e.g., by encrypting) data to be stored in a designated directory. The cryptographic file system layer can be used in combination with one or more cryptographic approaches to provide a server-based secure data solution that makes data provably secure and accessible, while eliminating the need for multiple perimeter hardware and software technologies. In one implementation (e.g., Bitfiler from Security First Corp.), the server-based solution addresses security at the bit level. For example, data security is incorporated or woven directly into the data at the bit level. In some embodiments, the server-based solution may be a software application that runs on any suitable operating system, such as a Windows or a Linux platform. In some embodiments, by operating at the kernel level, large improvements in performance and ease of use are achieved. In some embodiments, the server-based solution enables enterprise Communities of Interest (COI) to be established that can leverage a common enterprise infrastructure, both in terms of hardware and software. Because security is already woven into the data, this common infrastructure can be used without compromising data security and access control. Multiple COIs can co-exist within the same infrastructure and within a single secure storage system. With the server-based solution, no forensically discernible data is stored on any device or media. The server-based solution may integrate with existing enterprise access control systems, allowing simplified deployment without modification of current, established access solutions.

In another aspect, the server-based solution of the present invention is hardware and software independent. The server-based solution applies to existing enterprise network, storage and security solutions. The server-based solution also applies to any collaboration, CRM and ERP applications. The built-in security provided by the server-based solution enables the use of emerging, cost effective technologies and services such as the infrastructure for cloud-based storage, cloud-based computing and cloud-based applications.

The server-based solution of the present invention may leverage Security First Corp.'s SecureParser Extended™ ($SP_\chi$) core technology. In some embodiments, the SecureParser $SP_\chi$ utilizes a multi-factor secret sharing algorithm to deliver defense-level security. Data is authenticated, encrypted (FIPS 140-2 certified, Suite B compliant), split, redundant bits added, integrity checked and encrypted again before being sent to multiple locations (locally and/or geographically dispersed, e.g., in a private or public cloud). Data may be split using any suitable information dispersal algorithm (IDA). The data is hidden while in transit to the storage location, and is inaccessible to users who do not have the correct credentials for access.

In some embodiments, a cryptographic file system layer is used to secure data being written to or read from storage. As used herein, a cryptographic file system layer is a software layer for intercepting data to be stored on a file system and identifying at least some of the intercepted data, e.g., by securing data being stored in the file system, or restoring secured data retrieved from the file system. The cryptographic file system layer intercepts data passing between the application layer and the file system and modifies only data that is located in one or more designated directories. If a file is in a designated directory, it is modified before being stored, which provides increased security for that file; if the file is not in a designated directory, it is not modified. Retrieved files in a designated directory are also modified in order to reverse the modification that the cryptographic file system layer performed before the file was stored.

BRIEF DESCRIPTION OF THE DRAWINGS

The present disclosure is described in more detail below in connection with the attached drawings, which are meant to illustrate and not to limit the disclosure, and in which:

FIG. 13 is a block diagram showing an illustrative arrangement of several software layers including a cryptographic file system layer, according to one implementation.

DETAILED DESCRIPTION OF THE ILLUSTRATIVE EMBODIMENTS

Figure 1:
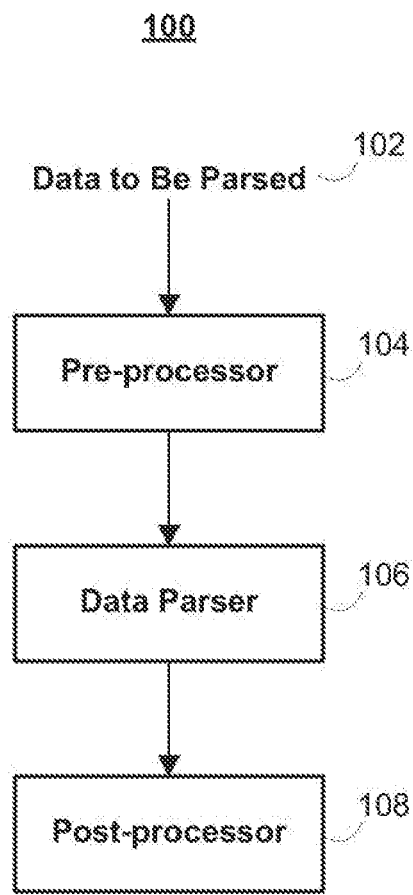
FIG. 1 illustrates a process for securing data including illustrative features that may be used in combination with any of the processes discussed herein, in accordance with an implementation.

According to one aspect, a cryptographic system is described herein where one or more secure servers store cryptographic keys and user authentication data. The cryptographic system may include a secure data parser either alone or in combination with other system components. As used herein, a secure data parser includes software and; or hardware configured to perform various functions relating to one or more of the parsing, securing, and storing of data. For example, the functions of the secure data parser may include any combination of encrypting data, parsing data into one or more shares, encrypting shares, dispersing shares, securely storing shares in multiple locations, retrieving data shares, decrypting data shares, reassembling data, decrypting data, or any other functions described herein, Parsing includes generating one or more distinct shares from an original data set where each of the shares includes at least a portion of the original data set. Parsing can be implemented by any of a number of techniques. For example, parsing may involve distributing data units from the original data set into one or more shares randomly, pseudo-randomly, deterministically, or using some suitable combination of random, pseudo-random, and deterministic techniques. A parsing operation may act on any size of data, including a single bit, a group of bits, a group of bytes, a group of kilobytes, a group of megabytes, or larger groups of data, as well as any pattern or combination of data unit sizes. Thus, the original data can be viewed as a sequence of these data units. In some implementations, the parsing operation is based on parsing information generated by the secure data parser or by another component in the cryptographic system. The parsing information can be in any suitable form (e.g., one or more keys including a predetermined, deterministic, pseudo-random or random key). The parsing information may determine one or more aspects of the parsing operation, including any combination of the number of shares, the size of one or more shares, the size of the data units, the order of the data units within the shares, and the order of the data from the original data set in the shares. In some embodiments, the parsing information may also indicate or may be used (among other factors) to determine how one or more data shares will be encrypted. While certain parsing techniques may render the data more secure (e.g., in some implementations, the size of the data units themselves may render the resulting data shares more secure, or the parsing may involve rearranging data data), this is not necessarily the case with every parsing technique. The resulting shares may be of any size of data, and two or more resulting shares may contain different amounts of the original data set.

In some implementations, parsing may include performing a cryptographic operation on the original data set before, during, or after generating the one or more shares. For example, parsing may involve shuffling the order of the data units in the share, e.g., by rearranging the units of data into the resulting share or shares. In some implementations, parsing may involve Shuffling the order bits within each data unit, e.g., by rearranging sub-units within one or more data units that are distributed into the resulting share or shares, where a sub-unit includes at least a distinct portion of a data unit. Where parsing involves shuffling data in the original data set, the shuffling operation can be performed on any size of the original data set, including the entire original data set, the one or more shares, the data units, a single bit, a group of bits, a group of bytes, a group of kilobytes, a group of megabytes, or larger groups of data, as well as any pattern or combination of data unit sizes. Shuffling data may involve distributing the original data into one or more shares in a way that shuffles the data, distributing the original data into one or more shares and then shuffling the data in the resulting share(s), shuffling the original data and then distributing the shuffled data into one or more shares, or any combination thereof.

Thus, the resulting shares may include a substantially random distribution of the original data set. As used herein, a substantially random distribution of data refers to generating one or more distinct shares from an original data set where at least one of the shares is generated using one or more random or pseudo random techniques, random or pseudo-random information (e.g., a random or pseudo-random key), or any combination thereof. It will be understood that because generating a truly random number in a computer may not be practical, the use of a substantially random number will be sufficient. References to randomization herein is understood to include substantial randomization as when, for example, implemented using a computing device having limitations with regard to generating true randomization. As one example of data parsing that results in substantially random distribution of the original data into shares, consider an original data set 23 bytes in size, with the data unit size chosen to be one byte, and with the number of shares selected to be 4. Each byte would be distributed into one of the 4 shares. Assuming a substantially random distribution, a key would be obtained to create a sequence of 23 random numbers ($r_1$, $r_2$, $r_2$ through $r_{23}$), each with a value between 1 and 4 corresponding to the four shares. Each of the units of data (in this example, 23 individual bytes of data) is associated with one of the 23 random numbers corresponding to one of the four shares. The distribution of the bytes of data into the four shares would occur by placing the first byte of the data into share number $r_1$, byte two into share $r_2$, byte three into share $r_3$, through the $23^{rd}$ byte of data into share $r_{23}$. A wide variety of other possible steps or combination or sequence of steps, including adjusting the size of the data units, may be used in the parsing process. To recreate the original data, the reverse operation would be performed.

A parsing operation may add fault tolerance to the generated shares so that fewer than all of the shares are needed to restore the original data. For example, the parsing operation may provide sufficient redundancy in the shares such that only a subset of the shares is needed to reassemble or restore the data to its original or useable form. For example, the parsing may be done as a "3 of 4" parse, such that only three of the four shares are necessary to reassemble or restore the data to its original or useable form. This is also referred to as a "M of N parse" wherein N is the total number of shares, and M is at least one less than N.

FIG. 1 shows an illustrative secure data parsing system (also referred to herein as a secure data parser) 100. The secure data parsing system 100 may be implemented using hardware and/or software such as a parser program or software suite. The secure data parser may further include or interface with one or more data storage facilities and other hardware or software modules from which data can be received or transmitted and which may perform various functions on the data. The system 100 may include one or more of pre-processors 104, one or more data parsers 106, and one or more post-processors 108. All of features described with respect to the system 100 are optional and the operations performed by pre-processor 104, data parser 106, and post-processor 108 may be performed in any possible combination or order. The secure data parser 100 receives data to be secured 102 and passes the data to a pre-processor 104 that may perform any combination of pre-processing operations on the received data 102, such as encrypting the data, adding integrity information (e.g., a hash) to the data, and adding authentication information to the data. The pre-processing may alternatively or additionally involve accessing and/or generating one or more keys or other information used by the secure data parser 100. The one or more keys can be any suitable key(s) for generating distinct portions of data from an original data set and/or any suitable key for other operations described herein that are performed by the secure data parser 100. The key(s) may be generated randomly, pseudo-randomly, or deterministically. These and other pre-processing operations are described further herein.

After any desired pre-processing, the (optionally transformed) data 102 and any additional information, such as any suitable keys, are passed to a data parser 106. Data parser 106 may parse the received data to generate one or more shares from the data 102 using any of the parsing techniques described herein. The data parser 106 may use any suitable key for data parsing.

In some implementations, data parser 106 involves parsing one or more keys used in the encryption or parsing of the data. Any of the above-described parsing techniques may be used parse any key. In some embodiments, parsing a key causes the key to be stored in one or more shares, of the parsed data 102. In other embodiments, the key shares resulting from a key parsing operation are stored separately from the data shares resulting from the data parsing operation. These and other features and functions that may be performed by data parser 106 are described further herein.

After parsing the data and/or any keys, the parsed data and keys may be post-processed by one or more post-processors 108. The post-processor 108 may perform any one or more operations on the individual received data shares, such as encrypting one or more data shares, adding integrity information (e.g., a hash) to one or more shares, and adding authentication information to one or more shares. Post-processor 108 may also perform any one or more operations on the received keys or key shares, such as encrypting one or more keys or key shares, adding integrity information (e.g., a hash) to one or more keys or key shares, and adding authentication information to one or more keys or key shares. Post-process may also direct the data shares, keys, and/or key shares to be transmitted or stored. These and other features and functions that may be performed by post-processor 108 are described further herein.

The combination and order of processes used by the secure data parser 100 may depend on the particular application or use, the level of security desired, whether optional pre-encryption, post-encryption, or both, are desired, the redundancy desired, the capabilities or performance of an underlying or integrated system, or any other suitable factor or combination of factors.

In one implementation, the data parser 106 parses the data to generate four or more Shares of data or keys, and the post-processor 108 encrypts all of the shares, then stores these encrypted shares in different locations in the database from which they were received. Alternatively or additionally, the post-processor 108 may relocate the encrypted shares to any of one or more suitable storage devices, which may be fixed or removable, depending on the requestor's need for privacy and security. In particular, the encrypted shares can be stored virtually anywhere, including, but not limited to, a single server or data storage device, or among separate data storage facilities or devices. Management of any keys used by the secure data parser 100 may be handled by the secure data parser 100, or may be integrated into an existing infrastructure or any other desired location. The retrieval, recombining, reassembly or reconstituting of the encrypted data shares may also utilize any number of authentication techniques, including, but not limited to, biometrics, such as fingerprint recognition, facial scan, hand scan, iris scan, retinal scan, ear scan, vascular pattern recognition or DNA analysis.

Traditional encryption technologies rely on one or more keys used to encrypt the data and render it unusable without the one or more keys. The data, however, remains whole and intact and subject to attack. In some embodiments, the secure data parser addresses this problem by parsing the encrypted file into two or more shares, adding another layer of encryption to each share of the data, and then storing the shares in different physical and/or logical locations. When one or more data shares are physically removed from the system, either by using a removable device, such as a data storage device, or by placing the share under another party's control, any possibility of compromise of secured data is effectively removed. In some embodiments, the encrypted file is parsed into four or more portions or shares.

Figure 2:
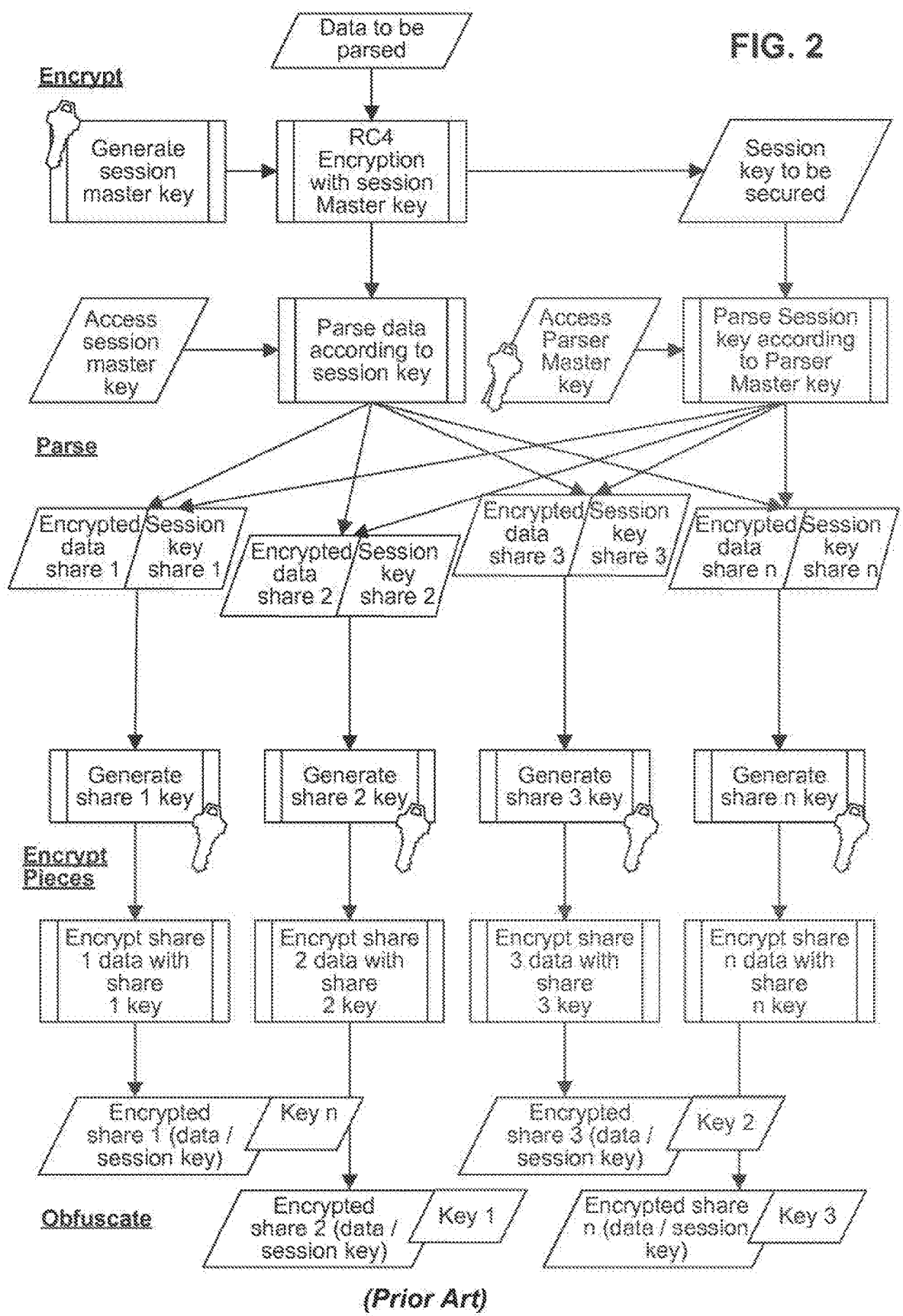
FIG. 2 illustrates a process for parsing data with encryption and storage of the encryption master key with the data in accordance with an implementation.

One example of a secure data parser is shown in FIG. 2, which shows the following steps of a process performed by the secure data parser on the data to be parsed, resulting in storing a session master key with the parsed data:

1. Generating a session master key and encrypting the data using, for example, the RS1 or the RC4 stream cipher.

2. Parsing the resulting encrypted data into four data shares according to the pattern of the session master key.

3. Parsing the session master key according to the pattern of a Parser Master Key and appending the resulting key shares to the data shares. The resulting four shares of data will contain portions of the encrypted original data and portions of the session master key. In other embodiments, the session master key is not stored with the data shares (see, e.g., FIG. 3 and accompanying discussions).

4. Generating a stream cipher key for each of the four shares.

5. Encrypting each share with its respective stream cipher key, then storing the encryption keys in different locations from the encrypted shares. As shown in FIG. 2, Share 1 is stored with Key 4, Share 2 is stored with Key 1, Share 3 is stored with Key 2, and Share 4 is stored with Key 3. However, any other pairing of keys with shares may be used, including, for example, arrangements in which more than one key is stored with a particular share, or in which the same key is parsed and stored across multiple shares.

To restore the original data format, the above steps are reversed. For example, to restore the original data in the example of FIG. 2, a sufficient number of the shares are retrieved. In implementations where the parsing operation includes redundancy, the original data can be restored from a minimum number of the total number of shares, which is less than the total number of shares. Thus, the original data can be restored from any suitable number of shares which, in this example, can range from one to four, depending on the parsing operation used. The cipher keys for each of the retrieved shares are also received. Each share may be decrypted with the stream cipher key that was used to encrypt the respective share. The session master key may be retrieved, or key shares of the parsed session master key are also retrieved from the shares. As with the data shares, the session master key can be restored from a minimum number (that may be less than or equal to all) of the total key shares, depending on key parsing operation used. The session master is restored from the key shares by reversing the key parsing operation. The data shares retrieved from the shares may also be restored by reversing the data parsing operation, which may involve the use of the retrieved or restored session master key. If the data restored by reversing the parse operation had been encrypted before parsing, the original data may be revealed by decrypting the restored data. Further processing may be performed on the data as needed.

In the above example, the secure data parser may be implemented with external session key management or secure internal storage of session keys. Upon implementation, the Parser Master Key for securing the application and for encryption purposes is generated. The incorporation of the Parser Master key in the resulting shares allows for a flexibility of sharing of secured data by individuals within a workgroup, enterprise or extended audience.

Figure 3:
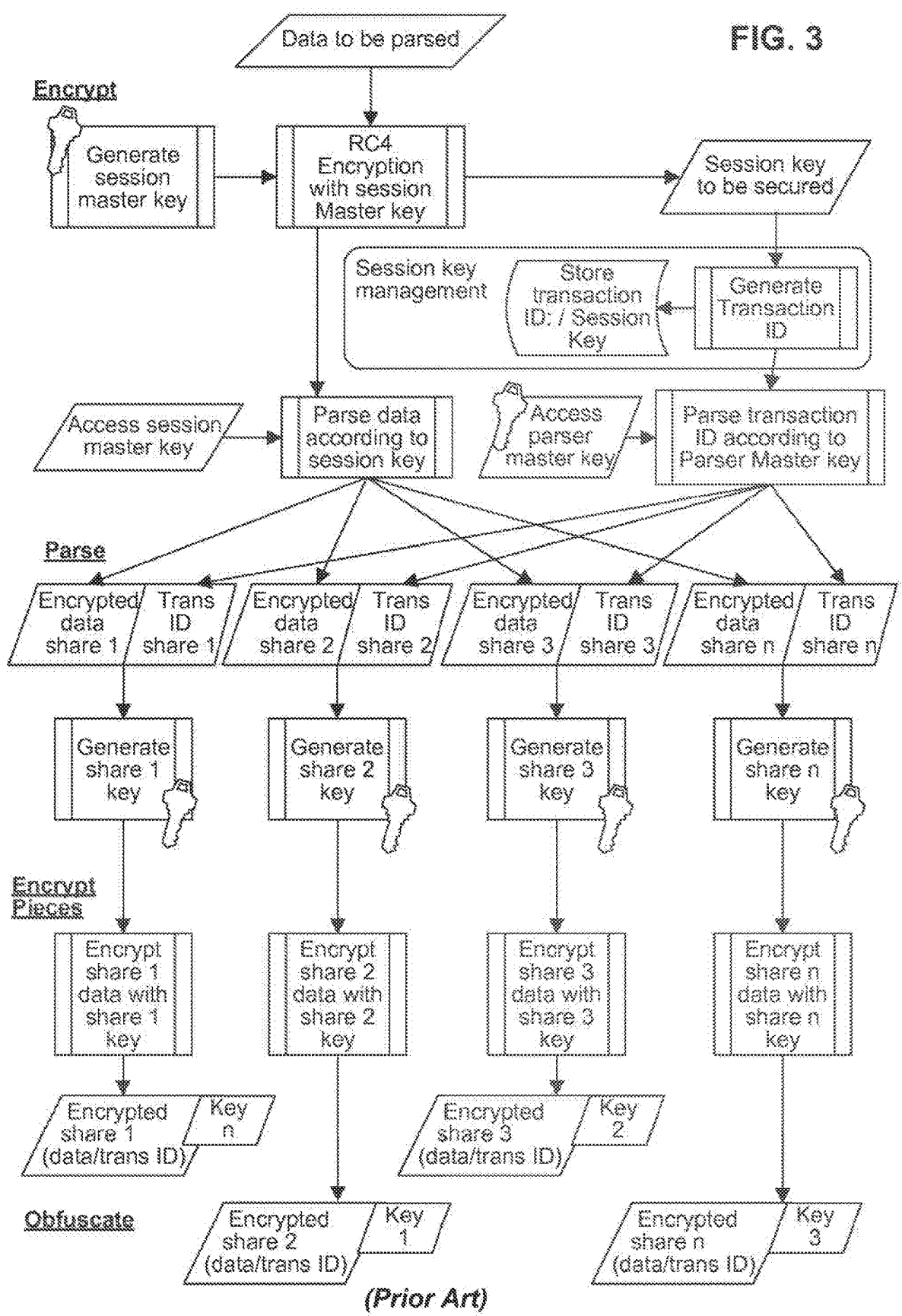
FIG. 3 illustrates a process for parsing data with encryption and storing the encryption master key separately from the data in accordance with an implementation.

FIG. 3 depicts another example of the secure data parser, including another process that may be performed by the secure data parser, resulting in storing the session master key data in one or more separate key management tables. The steps of generating a session master key, encrypting the data to be parsed with the session master key, and parsing the resulting encrypted data into four shares or portions of parsed data according to the pattern of the session master key are similar to the corresponding steps described above in relation to FIG. 2.

In this example, the session master key will be stored in a separate key management table in a data depository. A unique transaction ID is generated for this transaction. The transaction ID and session master key are stored in the separate key management table. The transaction ID is parsed according to the pattern of the Parser Master Key, and shares of the transaction ID are appended to the encrypted parsed data. The resulting four shares will contain encrypted portions of the original data and portions of the transaction ID.

As in FIG. 2, a stream cipher key is generated for each of the four data shares, each share is encrypted with its respective stream cipher key, and the encryption keys used to encrypt the data shares are stored separately from the data shares (e.g., in different locations from the encrypted data shares). To restore the original data, the steps are reversed.

Figure 4:
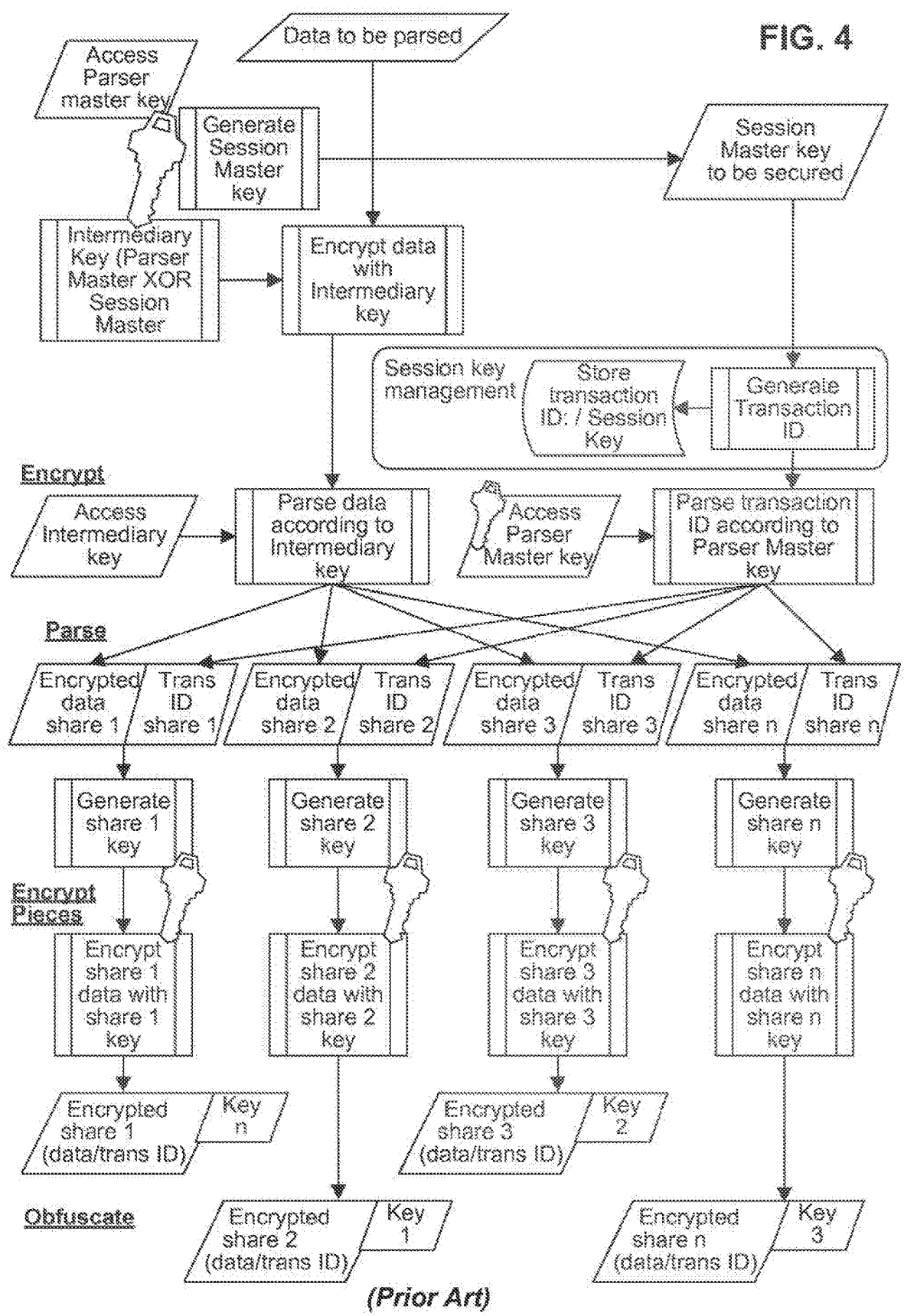
FIG. 4 illustrates the intermediary key process for parsing data with encryption and storage of the encryption master key with the data in accordance with an implementation.

FIG. 4 depicts another example of the secure data parser, including another process that may be performed by a secure data parser on the data to be parsed. This example involves use of an intermediary key. The process includes the following steps:

1. Accessing a Parser Master Key associated with the authenticated user.

2. Generating a unique Session Master key.

3. Deriving an Intermediary Key, for example, using an exclusive OR (XOR) function of the Parser Master Key and Session Master key.

4. Optionally encrypting the data using an encryption algorithm keyed with the Intermediary Key.

5. Parsing the optionally encrypted data into four shares of parsed data according to the pattern of the Intermediary Key.

6. Generating a unique transaction ID and storing the transaction ID and session master key in a separate key management table.

7. Parsing the transaction ID according to the pattern of the Parser Master Key.

8. Appending shares of the transaction ID to the shares of parsed data. The resulting combined shares will contain optionally encrypted portions of the original data and portions of the session master key.

9. Optionally generating an encryption key for each of the four data shares.

10. Optionally encrypting each share with an existing or new encryption algorithm, then storing the encryption keys in different locations from the combined shares. As shown in FIG. 4, Share 1 is stored with Key 4, Share 2 is stored with Key 1, Share 3 is stored with Key 2, and Share 4 is stored with Key 3.

To restore the original data format, the steps are reversed.

In some embodiments, the above steps 6-8 above may be replaced by the following steps:

6. Storing the Session Master Key along with the secured data shares in a data depository.

7. Parsing the session master key according to the pattern of the Parser Master Key.

8. Appending the key data to the optionally encrypted shares.

Certain steps of the methods described herein (e.g., the steps described for any of the methods depicted in FIGS. 2-4) may be performed in different order, or repeated multiple times, as desired. It is also readily apparent to those skilled in the art that the portions of the data may be handled differently from one another. For example, multiple parsing steps may be performed on only one portion of the parsed data. Each portion of parsed data may be uniquely secured in any desirable way provided only that the data may be reassembled, reconstituted, reformed, decrypted or restored to its original or other usable form. It is understood that one or more of these methods may be combined in the same implementation without departing from the scope of the disclosure.

The data secured according to the methods described herein is readily retrievable and restored, reconstituted, reassembled, decrypted, or otherwise returned into its original other suitable form for use. In order to restore the original data, the following items may be utilized:

1. Some or all shares or portions of the data set.
2. Knowledge of and ability to reproduce the process flow of the method Used to secure the data.
3. Access to the session muster key.
4. Access to the Parser Master Key.

In some embodiments, not all of these items may be required to retrieve and restore, reconstitute, reassemble, decrypt, or otherwise return into the original or other suitable form for use, every unit of data secured according to one or more of the above-described methods. In some embodiments, additional items not expressly listed above may be required to restore a particular unit of data. For example, in some implementations, the above-described methods use three types of keys for encryption. Each type of key may have individual key storage, retrieval, security and recovery options, based on the installation. The keys that may be used include, but are not limited to:

1. The Parser Master Key May be an individual key associated with the installation of the secure data parser. It is installed on the server on which the secure data parser has been deployed. There are a variety of options suitable for storing this key including, but not limited to, a smart card, separate hardware key store, standard key stores, custom key stores or within a secured database table, for example.
2. The Session Master Key may be generated each time data is parsed. The Session Master Key is used to encrypt the data prior to the parsing operations. It may also be used (if the Session Master Key is not integrate into the parsed data) for parsing the encrypted data. The Session Master Key may be stored in a variety of manners, including, but not limited to, a standard key store, custom key store, separate database table, or secured within the encrypted shares, for example.
3. The Share Encryption Keys: For each share or portions of a data set that is created, an individual Share Encryption Key may be generated to further encrypt the shares. The Share Encryption Keys may be stored in different shares than the share that was encrypted.

As shown in FIG. 4, an Intermediary Key can also be utilized. The Intermediary Key may be generated each time data is parsed. The Intermediary Key is used to encrypt the data prior to the parsing operations. It may also be incorporated as a means of parsing the encrypted data.

Figure 5:
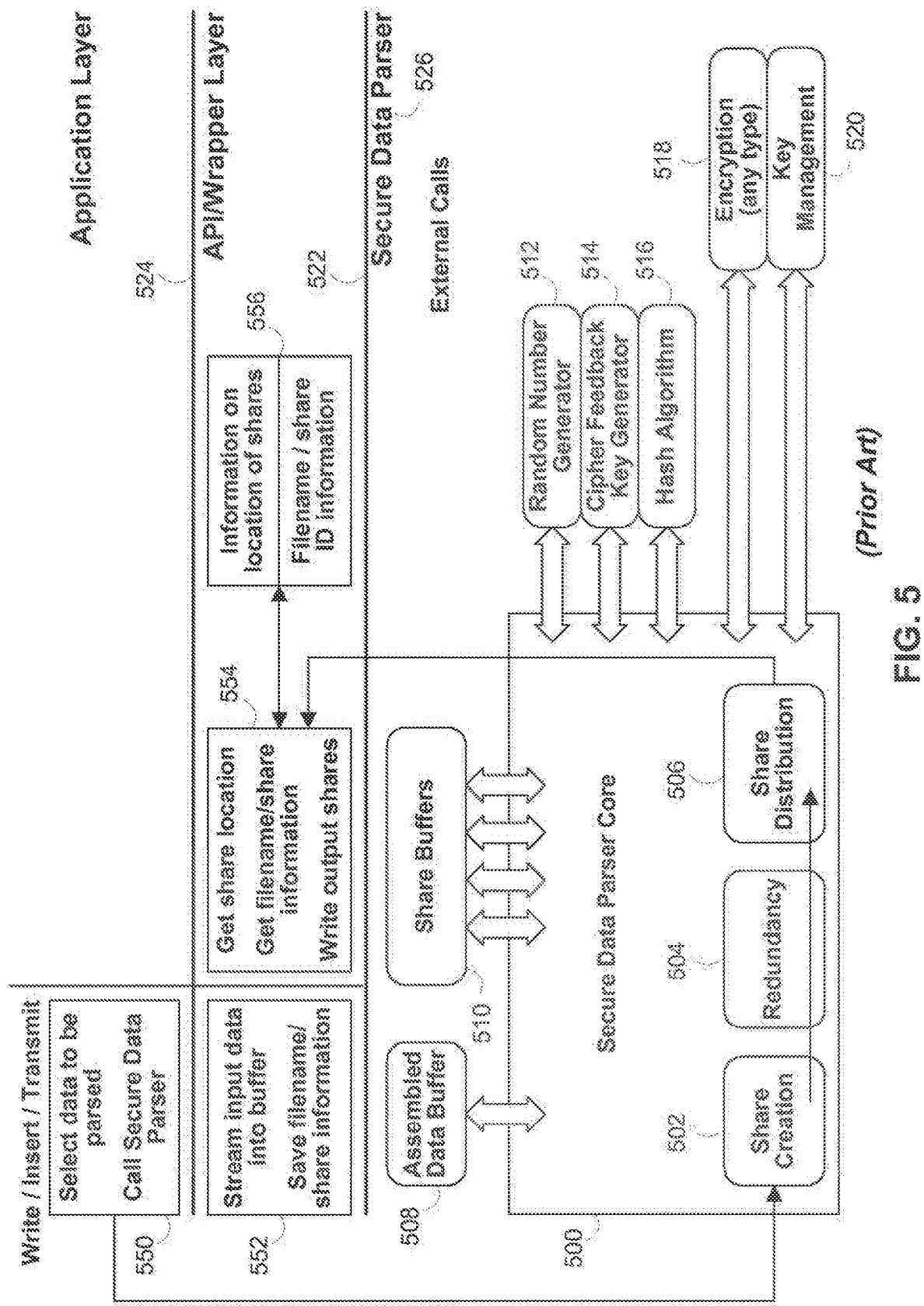
FIGS. 5 and 6 are block diagrams of an illustrative system having the secure data parser integrated in accordance with an implementation.

FIG. 5 shows an illustrative implementation of the secure data parser as secure data parser 500. Secure data parser 500 may include built-in capabilities for parsing data into shares using module 502. Secure data parser 500 may also include built in capabilities in module 504 for performing redundancy in order to be able to implement, for example, the M of N parse described above. Secure data parser 500 may also include share distribution capabilities using module 506 for placing the shares into butters from which they are sent for communication to a remote location, for storage, etc. It will be understood that any other suitable capabilities may be built into secure data parser 500.

Assembled data buffer 508 may be any suitable memory used to store the original data (although not necessarily in its original form) that will be parsed by secure data parser 500. In a parsing operation, assembled data buffer 508 provides input to secure data parser 500. In a restore operation, assembled data buffer 508 may be used to store the output of secure data parser 500.

Share buffers 510 may be one or more memory modules that may be used to store the multiple shares of data that resulted from the parsing of original data. In a parsing operation, share buffers 510 hold the output of the secure data parser. In a restore operation, share buffers hold the input to secure data parser 500.

It will be understood that any other suitable arrangement of capabilities may be built-in for secure data parser 500. Any additional features may be built-in and any of the features illustrated may be removed, made more robust, made less robust, or may otherwise be modified in any suitable way. Buffers 508 and 510 are likewise merely illustrative and may be modified, removed, or added to in any suitable way.

Any suitable modules implemented in software, hardware or both may be called by or may call to secure data parser 500. As illustrated, some external modules include random number generator 512, cipher feedback key generator 514, hash algorithm 516, any one or more types of encryption 518, and key management 520. It will be understood that these are merely illustrative external modules. Any other suitable modules may be used in addition to or in place of those illustrated. If desired, one or more external modules may replace capabilities that are built into secure data parser 500.

Cipher feedback key generator 514 may generate, for each secure data parser operation, a unique key, or random number (using, for example, random number generator 512), to be used as a seed value for an operation that extends an original session key size (e.g., a value of 128, 256, 512, or 1024 bits) into a value equal to the length of the data to be parsed. Any suitable algorithm may be used for the cipher feedback key generation, such as the AES cipher feedback key generation algorithm.

In order to facilitate integration of secure data parser 500 and its external modules (i.e., secure data parser layer 526) into an application layer 524 (e.g., an email application or database application), a wrapping layer that may use, for example, API function calls may be used. Any other suitable arrangement for integrating secure data parser layer 526 into application layer 524 may be used.

FIG. 5 also shows how the secure data parser 500 and external modules may be used when a write (e.g., to a storage device), insert (e.g., in a database field), or transmit (e.g., across a network) command is issued in application layer 524. At step 550 data to be parsed is identified and a call is made to the secure data parser. The call is passed through wrapper layer 522 where at step 552, wrapper layer 522 streams the input data identified at step 550 into assembled data buffer 508. Also at step 552, any suitable share information, filenames, any other suitable information, or any combination thereof may be stored (e.g., as information 556 at wrapper layer 522). Secure data processor 500 then parses the data it takes as input from assembled data buffer 508. It outputs the data shares into share buffers 510. At step 554, wrapper layer 522 obtains from stored information 556 any suitable share information (i.e., stored by wrapper 522 at step 552) and share location(s) (e.g., from one or more configuration files). Wrapper layer 522 then writes the output shares (obtained from share buffers 510) appropriately (e.g., written to one or more storage devices, communicated onto a network, etc.).

Figure 6:
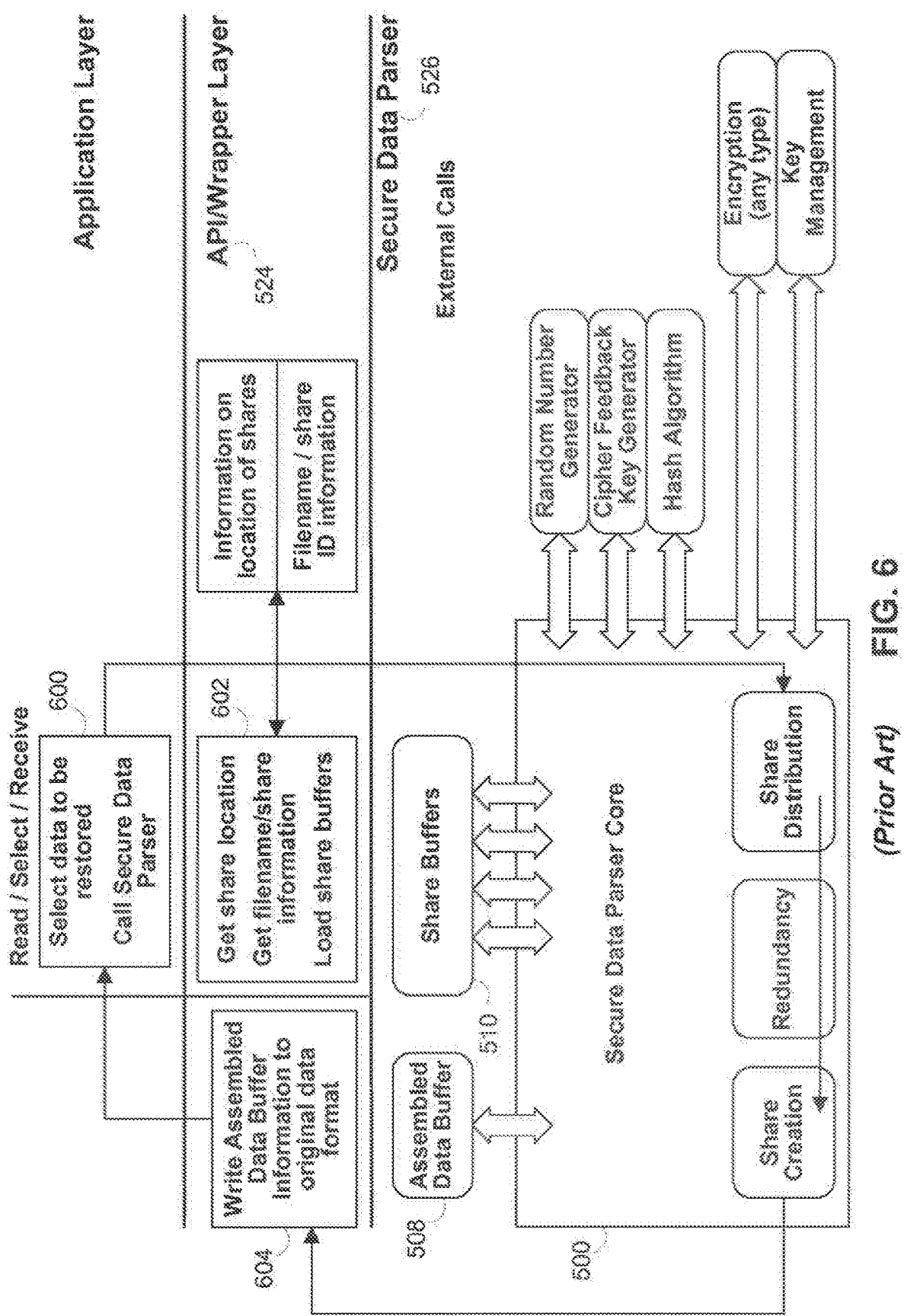

FIG. 6 shows how the secure data parser 500 and external modules may be used when a read (e.g., from a storage device), select (e.g., from a database field), or receive (e.g., from a network) occurs. At step 600, data to be restored is identified and a call to secure data parser 500 is made from application layer 524. At step 602, from wrapper layer 522, any suitable share information is obtained and share location is determined. Wrapper layer 522 loads the portions of data identified at step 600 into share buffers 510. Secure data parser 500 then processes these shares as described herein (e.g., if only three of four shares are available, then the redundancy capabilities of secure data parser 500 may be used to restore the original data using only the three shares). The restored data is then stored in assembled data buffer 508. At step 504, application layer 522 converts the data stored in assembled data buffer 508 into its original data format (if necessary) and provides the original data in its original format to application layer 524.

Figure 7:
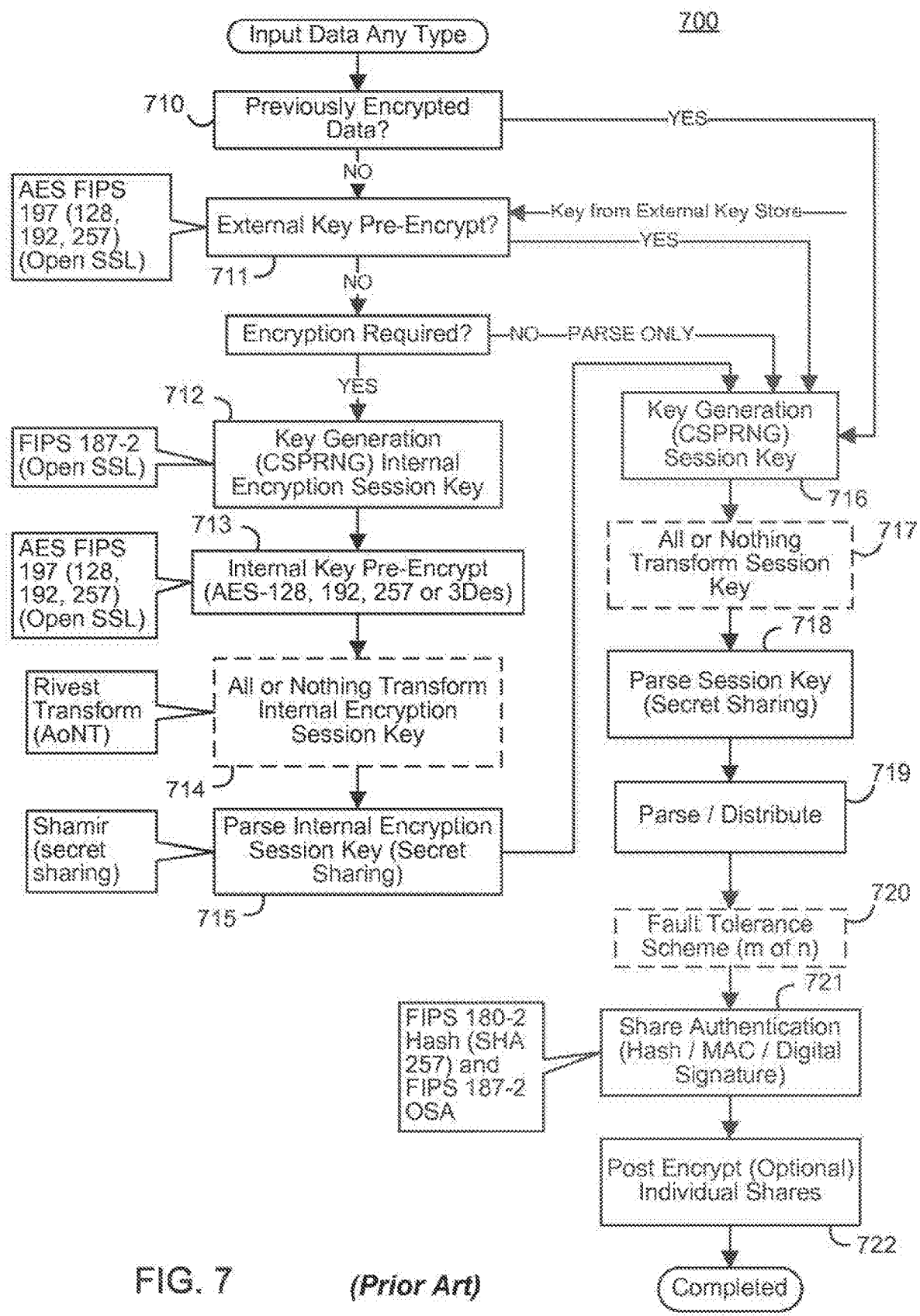
FIG. 7 is a process flow diagram of illustrative steps and features that may be used in any suitable combination, with any suitable additions, deletions, or modifications in accordance with an implementation.

FIG. 7 depicts example options 700 for using the components of the secure data parser. Several exemplary combinations of options are outlined below to reference to FIG. 7. As described in relation to FIGS. 5 and 6, the secure data parser may be modular in nature, allowing for any known algorithm to be used within each of the function blocks shown in FIG. 7. The labels shown in the example of FIG. 7 merely depict one possible combination of algorithms. Any suitable algorithm or combination of algorithms may be used in place of the labeled algorithms. For example, other key parsing (e.g., secret sharing) algorithms such as Blakely may be used in place of Shamir, or the AES encryption could be replaced by other known encryption algorithms such as Triple DES.

1) 710, 716, 717, 718, 719, 720, 721, 722

If previously encrypted data is received at step 710, the data may be parsed into a predefined number of shares. If the parse algorithm requires a key, a session key may be generated at step 716 using a cryptographically secure pseudo random number generator. The session key may optionally be transformed using an All or Nothing Transform (AoNT) into a transform session key at step 717 before being parsed into the predefined number of shares with fault tolerance at step 718. The data may then be parsed into the predefined number of shares at step 719. A fault tolerant scheme may be used at step 720 to allow for regeneration of the data from less than the total number of shares. Once the shares are created, authentication/integrity information may be embedded into the shares at step 721. Each share may be optionally post-encrypted at step 722.

2) 711, 716, 717, 718, 719, 720, 721, 772

In some embodiments, the input data may first be encrypted using a pre-encryption key provided by a user or an external system before the data is parsed. An external pre-encryption key is provided at step 711. For example, the key may be provided from an external key store. If the parse algorithm requires a key, the session key may be generated using a cryptographically secure pseudo-random number generator at step 716. The session key may optionally be transformed using an All or Nothing Transform (AoNT) into a transform session key at step 717 before being parsed into the predefined number of shares with fault tolerance at step 718. The data is then parsed to a predefined number of shares at step 719. A fault tolerant scheme may be used at step 720 to allow for regeneration of the data from less than the total number of shares. Once the Shares are created, authentication/integrity information may be embedded into the shares at step 721. Each share may be optionally post-encrypted at step 722.

3) 712, 713, 714, 715, 716, 717, 718, 719, 720, 721, 722

In some embodiments, encryption is required but an external key for the pre-encryption is not used. In such embodiments, an encryption key may be generated using a cryptographically secure pseudo-random number generator at step 712 to transform the data. Encryption of the data using the generated encryption key may occur at step 711. The encryption key may optionally be transformed using an All or Nothing Transform (AoNT) into a transform encryption key at step 714. The transform encryption key and/or generated encryption key may then be parsed into the predefined number of shares with limit tolerance at step 715. If the parse algorithm requires a key, generation of the session key using a cryptographically secure pseudo-random number generator may occur at step 716. The session key may optionally be transformed using an All or Nothing Transform (AoNT) into a transform session key at step 717 before being parsed into the predefined number of shares with fault tolerance at step 718. The data may then be parsed into a predefined number of shares at step 719. A fault tolerant scheme may be used at step 720 to allow for regeneration of the data from less than the total number of shares. Once the shares are created, authentication/integrity information will be embedded into the shares at step 721. Each share may then be optionally post-encrypted at step 722.

The secure data parser may offer flexible data protection by facilitating physical separation. Data may be first encrypted, then parsed into shares with "m of n" fault tolerance. This allows for regeneration of the original information when less than the total number of shares is available. For example, some shares may be lost or corrupted in transmission. The lost or corrupted shares may be recreated from fault tolerance or integrity information appended to the shares, as discussed in more detail below.

In order to create the shares, a number of keys are optionally utilized by the secure data, parser described above. These keys may include one or more of the following:

Pre-encryption key: When pre-encryption of the shares is selected, an external encryption key may be passed to the secure data parser. This key may degenerated and stored externally in a key store (or other location) and may be used to optionally encrypt data prior to parsing me data.

Internal encryption key: This key may be generated internally and used by the secure data parser to encrypt the data prior to parsing. This key may then be stored securely within the shares using a key parsing algorithm.

Session key: This key is not used with an encryption algorithm; rather, it may be used to key the data partitioning algorithms when random parsing is selected. When a random parse is used, a session key may be generated internally and used by the secure data parser to partition the data into shares. This key may be stored securely within the shares using a key parsing algorithm.

Post encryption key: When post encryption of the shares is selected an external key may be passed to the secure data parser and used to post encrypt the individual shares. This key may be generated and stored externally in a key store or other suitable location.

In some embodiments, when data is secured using the secure data parser in this way, the information may only be reassembled provided that of the required shares and external encryption keys are present.

In addition to the individual protection of information assets, there is sometimes a requirement to share information among different groups of users or communities of interest. It may then be necessary to either control access to the individual shares within that group of users or to share credentials among those users that would only allow members of the group to reassemble the shares. To this end, a workgroup key may be deployed to group members. The workgroup key should be protected and kept confidential, as compromise of the workgroup key may potentially allow those outside the group to access information. The workgroup key concept allows for enhanced protection of information assets by encrypting key information stored within the shares. Once this operation is performed, even if all required shares and other external keys are discovered, an attacker has no hope of recreating the information without access to the workgroup key.

Figure 8:
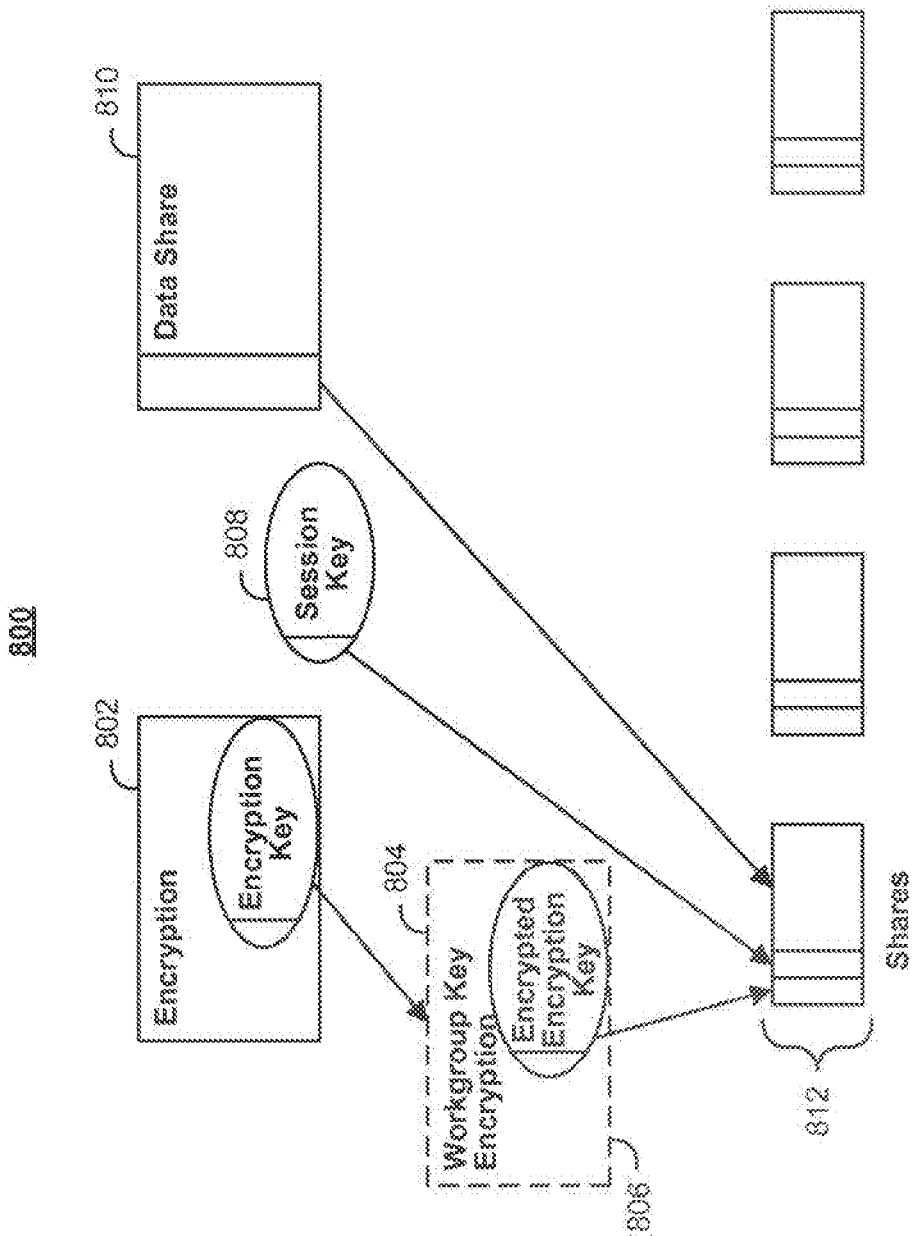
FIG. 8 is a simplified block diagram of the storage of key and data components within shares, optionally using a workgroup key, that may be used in any suitable combination, with any suitable additions, deletions, or modifications in accordance with one implementation.

FIG. 8 shows illustrative block diagram 800 for storing key and data components within the shares. In the example of diagram 800, the optional pre-encrypt and post-encrypt steps are omitted, although these steps may be included in other embodiments.

The simplified process to parse the data includes first encrypting the data using an encryption key at encryption stage 802. The encryption key may then optionally be encrypted with a workgroup key at stage 804. The encryption key, optionally encrypted by the workgroup key, may then be parsed into shares and stored within data shares 812. Session key 808 may also be parsed and stored within shares 812. Using the session key, encrypted data 810 is parsed and stored in shares 812.

In order to restore the data, the session key portions may be retrieved from the shares 812 and restored. The parsing operation of the data may then be reversed to restore the encrypted data. The shares of the encryption key (which was encrypted with the workgroup key) may be retrieved and the encrypted encryption key restored. The encrypted encryption key may then be decrypted using the workgroup key. Finally, the encrypted data may then be decrypted using the encryption key to reveal the original data.

There are several secure methods for deploying and protecting workgroup keys. The selection of which method to use for a particular application depends on a number of factors. These factors may include security level required, cost, convenience, and the number of users in the workgroup. Exemplary techniques include hardware-based key storage and software-based key storage.

Hardware-based solutions generally provide the strongest guarantees for the security of encryption/decryption keys in an encryption system. Examples of hardware-based storage solutions include tamper-resistant key token devices that store keys in a portable device (e.g., smartcard/dongle), or non-portable key storage peripherals. These devices are designed to prevent easy duplication of key material by unauthorized parties. Keys may be generated by a trusted authority and distributed to users, or generated within the hardware. Additionally, key storage systems may provide multi-factor authentication, where use of the keys requires access both a physical object (token) and a passphrase or biometric. While dedicated hardware-based storage may be desirable for high-security deployments or applications, other deployments may elect to store keys directly on local hardware (e.g., disks, RAM or non-volatile RAM stores such as USB drives). This provides a lower level of protection against insider attacks, or in instances where an attacker is able to directly access the encryption machine.

To secure keys on disk, software-based key management often protects keys by storing them in encrypted form under a key derived from a combination of other authentication metrics, including: passwords and passphrases, presence of other keys (e.g., from a hardware-based solution), biometrics, or any suitable combination. The level of security provided by such techniques may range from the relatively weak key protection mechanisms provided by some operating systems (e.g., MS Windows and Linux) to more robust solutions implemented using multi-factor authentication.

The secure data parser described herein may be advantageously used in a number of applications and technologies. For example, email system, RAID systems, video broadcasting systems, database systems, tape backup systems, or any other suitable system may have the secure data parser integrated at any suitable level. As previously discussed, it will be understand that the secure data parser may also be integrated for protection and fault tolerance of any type of data in motion through any transport medium, including, for example, wired, wireless, or physical transport mediums. As one example, voice over Internet protocol (VoIP) applications may make use of the secure data parser to solve problems relating to echoes and delays that are commonly found in VoIP. The need for network retry on dropped packets may be eliminated by using fault tolerance, which guarantees packet delivery even with the loss of a predetermined number of shares. Packets of data (e.g., network packets) may also be efficiently parsed and restored "on-the-fly" with minimal delay and buffering, resulting in a comprehensive solution for various types of data in motion. The secure data parser may act on network data packets, network voice packets, file system data blocks, or any other suitable unit of information. In addition to being integrated with a VoIP application, the secure data parser may be integrated with a file-sharing application (e.g., a peer-to-peer file-sharing application), a video broadcasting application, an electronic voting or polling application (which may implement an electronic voting protocol and blind signatures, such as the Sensus protocol), an email application, or any other network application that may require or desire secure communication.

Figure 9:
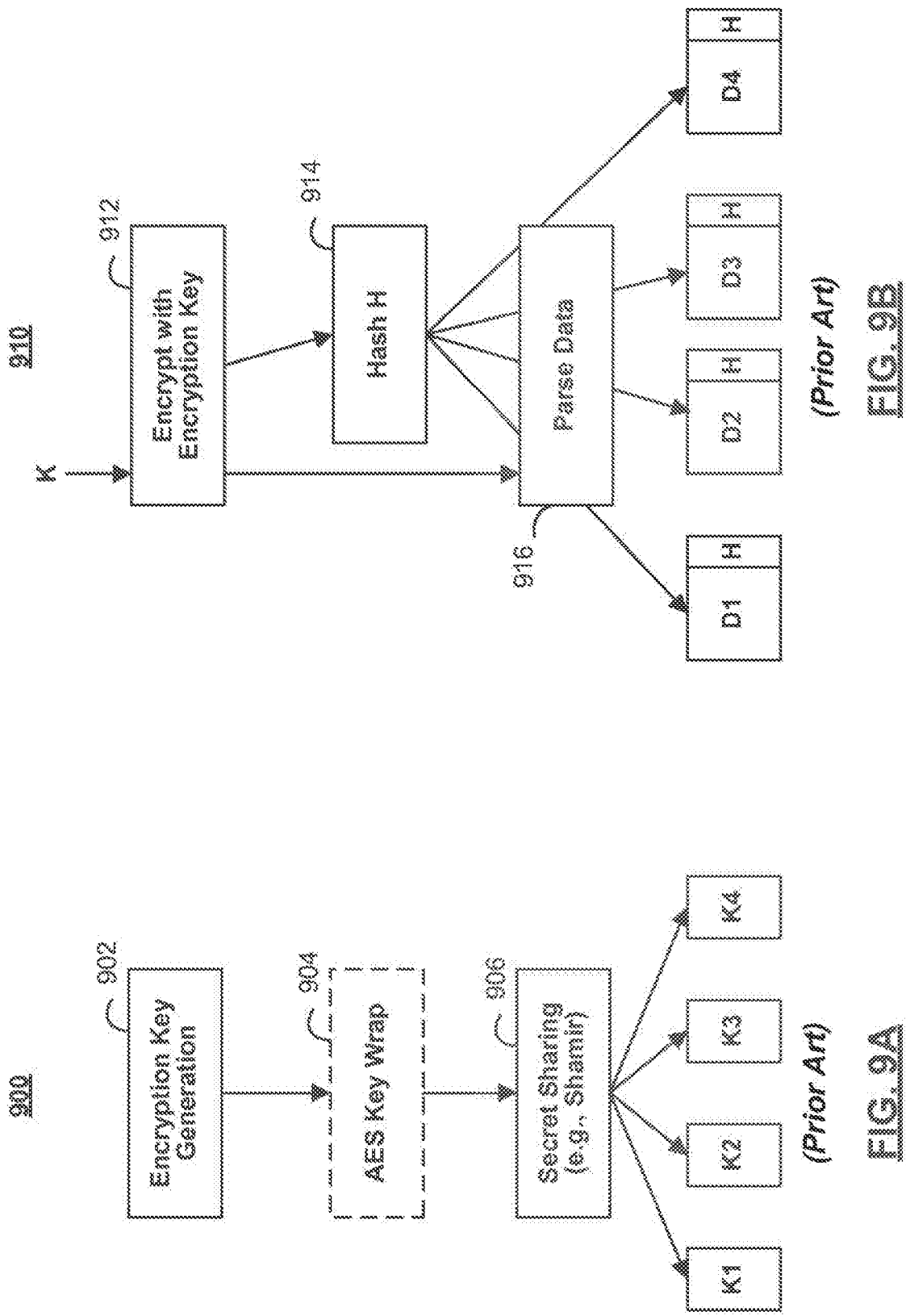
FIGS. 9A and 9B are simplified and illustrative process flow diagrams for header generation and data splitting for data in motion that may be used in any suitable combination, with any suitable additions, deletions, or modifications in accordance with one implementation.

In some embodiments, support for network data in motion may be provided by the secure data parser in two distinct phases—a header generation phase and a data parsing phase. Simplified header generation process 900 and simplified data parsing process 910 are shown in FIGS. 9A and 9B, respectively. One or both of these processes may be performed on network packets, file system blocks, or any other suitable information.

In some embodiments, header generation process 900 may be performed once at the initiation of a network packet stream. At step 902, a random (pseudo-random) encryption key, K, may be generated. The encryption key, K, may then be optionally encrypted (e.g., using the workgroup key described above) at AES key wrap step 904. Although an AES key wrap may be used in some embodiments, any suitable key encryption or key wrap algorithm may be used in other embodiments. AES key wrap step 904 may operate on the entire encryption key, K, or the encryption key may be parsed into several blocks (e.g., 64-bit blocks). AES key wrap step 904 may then operate on blocks of the encryption key, if desired.

At step 906, a secret sharing algorithm (e.g., Shamir) may be used to parse the encryption key, K, into key shares. Each key share may then be embedded into one of the output shares (e.g., in the share headers). Finally, a share integrity block and (optionally) a post-authentication tag (e.g., MAC) may be appended to the header block of each share. Each header block may be designed to fit within a single data packet.

After header generation is complete (e.g., using simplified header generation process 900), the secure data parser may enter the data partitioning phase using simplified data parsing process 910. Each incoming data packet or data block in the stream is encrypted using the encryption key, K, at step

912. At step 914, share integrity information (e.g., a hash H) may be computed on the resulting ciphertext front step 912. For example, a SHA-256 hash may be computed. At step 916, the data packet or data block may then be partitioned into two or more data shares using one of the data parsing algorithms described above. In some embodiments, the data packet or data block may be parsed so that each data share contains a substantially random distribution of the encrypted data packet or data block. The integrity information (e.g., hash H) may then be appended to each data share. An optional post-authentication tag (e.g., MAC) may also be computed and appended to each data share in some embodiments.

Each data share may include metadata, which may be necessary to permit correct reconstruction of the data blocks or data packets. This information may be included in the share header. The metadata may include such information as cryptographic key shares, key identities, share nonces, signatures/MAC values, and integrity blocks. In order to maximize bandwidth efficiency, the metadata may be stored in a compact binary format.

For example, in some embodiments, the share header includes a cleartext header chunk, which is not encrypted and may include such elements as the Shamir key share, per-session nonce, per-share nonce, key identifiers (e.g., a workgroup key identifier and a post-authentication key identifier). The share header may also include an encrypted header chunk, which is encrypted with the encryption key. An integrity header chunk, which may include integrity checks for any number of the previous blocks (e.g., the previous two blocks), may also be included in the header. Any other suitable values or information may also be included in the share header.

Figure 10:
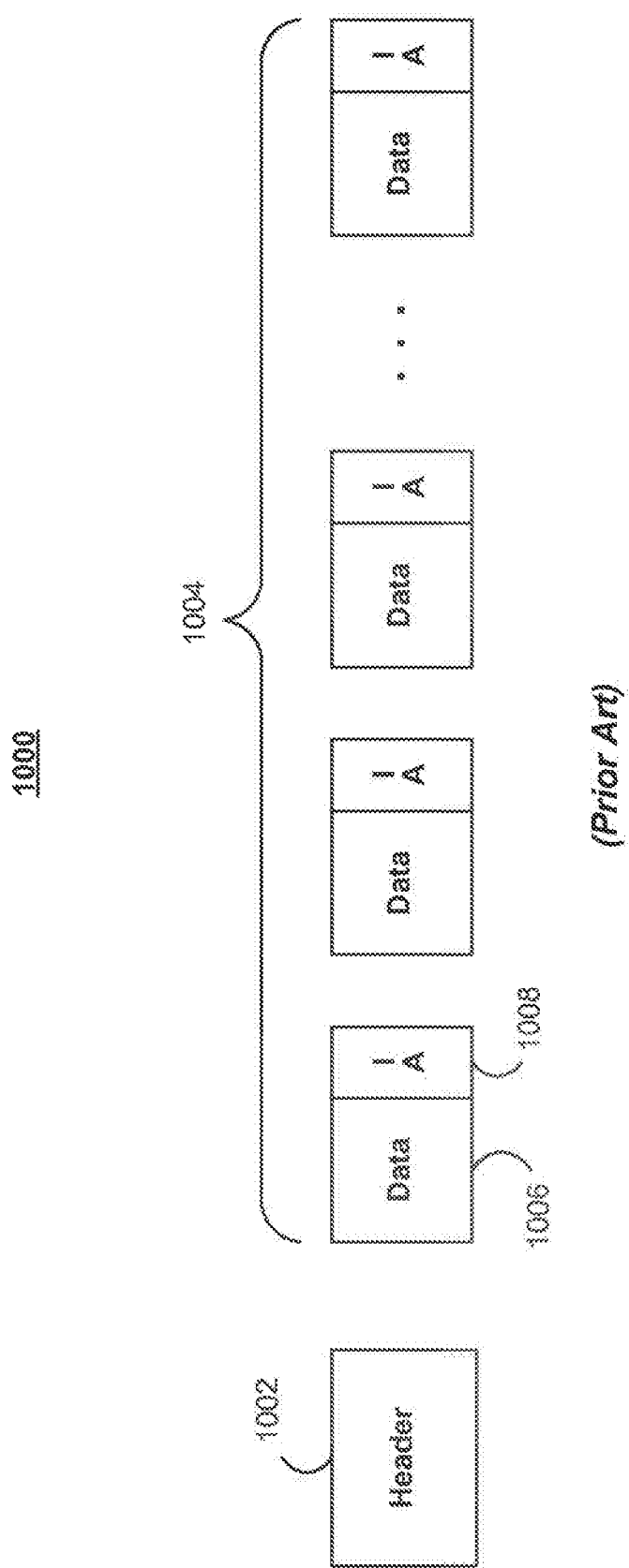
FIG. 10 is a simplified block diagram of an illustrative share format, that may be used in any suitable combination, with any suitable additions, deletions, or modifications in accordance with one implementation.

As shown in illustrative share format 1000 of FIG. 10, header block 1002 may be associated with two or more output blocks 1004. Each header block, such as header block 1002, may be designed to fit within a single network data packet. In some embodiments, after header block 1002 is transmitted from a first location to a second location, the output blocks may then be transmitted. Alternatively, header block 1002 and output blocks 1004 may be transmitted at the same time in parallel. The transmission may occur over one or more similar or dissimilar communications paths.

Each output block may include data portion 1006 and integrity/authenticity portion 1008. As described above, each data share may be secured using a share integrity portion including share integrity information (e.g., a SHA-256 hash) of the encrypted, pre-partitioned data. To verify the integrity of the outputs blocks at recovery time, the secure data parser may compare the share integrity blocks of each share and then invert the parse algorithm. The hash of the recovered data may then be verified against the share hash.

In some embodiments, a keyed secret sharing routine may be employed using keyed information dispersal (e.g., through the use of a keyed information dispersal algorithm or "IDA"). The key for the keyed IDA may also be protected by one or more external workgroup keys, one or more shared keys, or any combination of workgroup keys and shared keys. In this way, a multi-factor secret sharing scheme may be employed. To reconstruct the data, at least "M" shares plus the workgroup key(s) (and or shared key(s)) may be required in some embodiments. The IDA (or the key for the IDA) may also be driven into the encryption process. For example, the transform may be driven into the clear text (e.g., during the pre-processing layer before encrypting) and may further protect the clear text before it is encrypted.

In some embodiments, the session key may be encrypted using a shared key (e.g., a workgroup key) before being parsed to generate one session key shares. Two or more user shares may then be formed by combining at least one encrypted data set share and at least one session key share. In forming a user share, in some embodiments, the at least one session key share may be interleaved into an encrypted data set share. In other embodiments, the at least one session key share may be inserted into an encrypted data set share at a location based at least in part on the shared workgroup key. For example, keyed information dispersal may be used to distribute each session key share into a unique encrypted data set share to form a user share. Interleaving or inserting a session key share into an encrypted data set share at a location based at least in part on the shared workgroup may provide increased security in the face of cryptographic attacks. In other embodiments, one or more session key shares may be appended to the beginning or end of an encrypted data set share to form a user share. The collection of user shares may then be stored separately on at least one data depository. The data depository or depositories may be located in the same physical location (for example, on the same magnetic or tape storage device) or geographically separated (for example, on physically separated servers in different geographic locations). To reconstruct the original data set, an authorized set of user shares and the shared workgroup key may be required.

The secure data parser may be used to implement a cloud computing data security solution. Cloud computing is network-based computing, storage, or both where computing and storage resources may be provided to computer systems and other devices over a network. Cloud computing resources are generally accessed over the Internet, but cloud computing may be performed over any suitable public or private network. Cloud computing may provide a level of abstraction between computing resources and their underlying hardware components (e.g., servers, storage devices, networks), enabling remote access to a pool of computing resources. These cloud computing resources may be collectively referred to as the "cloud." Cloud computing may be used to provide dynamically scalable and often virtualized resources as a service over the Internet or any other suitable network or combination of networks.

Figure 11:
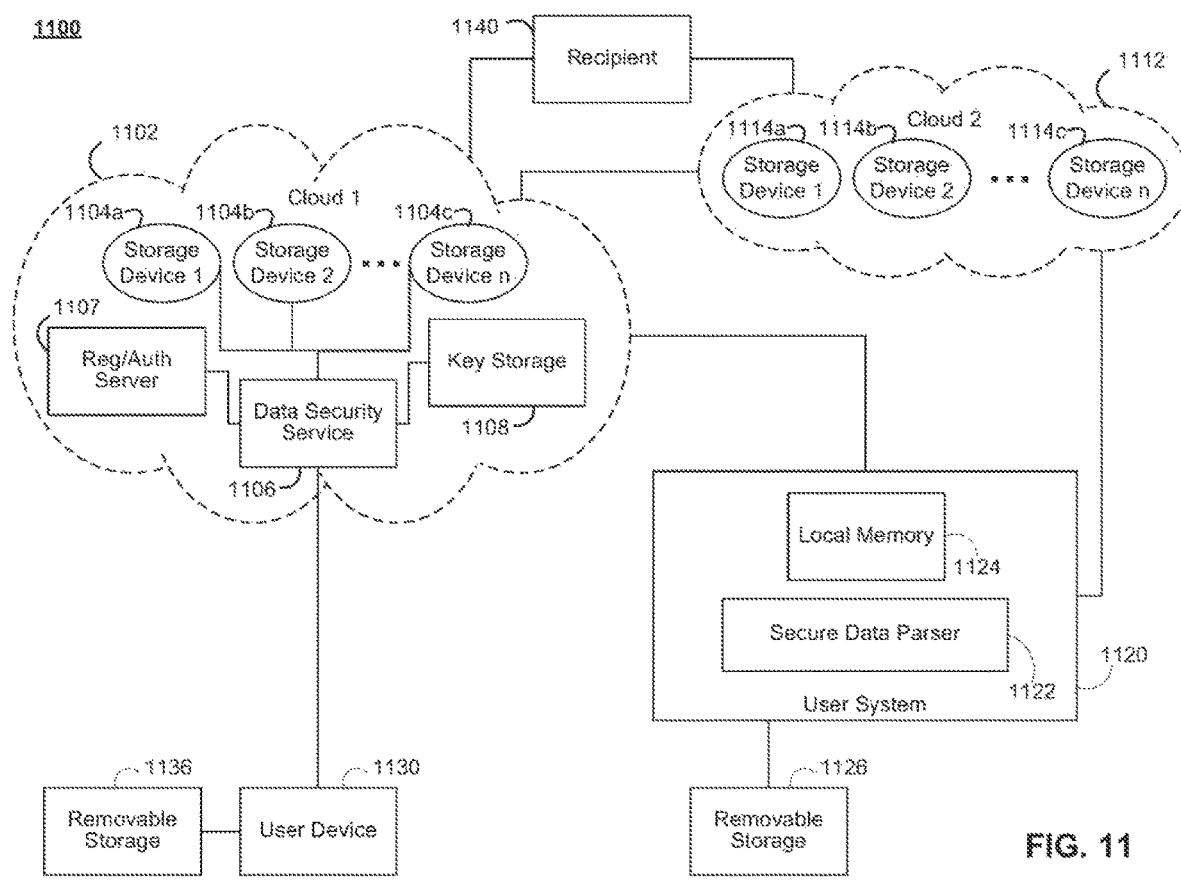
FIG. 11 is a block diagram showing several exemplary arrangements for implementing a cloud computing data security solution in accordance with an implementation.

A network 1100 showing several arrangements for using a secure data parser for implementing a cloud computing data security solution is shown in FIG. 11. The network 1100 includes two clouds, 1102 and 1112, for data and key processing and/or storage, a user system 1120 that has a local secure data parser 1122, a user device 1130 that does not have a local secure data parser, and a data recipient 1140.

User systems 1120 and 1130 are coupled to cloud 1102 which includes a number of cloud resources for storing data shares, an other functions. User systems 1120 and 1130 may include any suitable hardware, such as a computer terminal, personal computer, handheld device (e.g., PDA, Blackberry, smart phone, tablet device), cellular telephone, computer network, any other suitable hardware, or any combination thereof. User system 1120 may be configured to run a secure data parser 1122 which may be similar to the various embodiments of secure data parsers described above. The secure data parser 1122 may be integrated at any suitable level of the user system 1120. For example, secure data parser 1122 may be integrated into the hardware and/or software of user system 1120 at a sufficiently back-end level such that the presence of secure data parser 1122 may be substantially transparent to an end user of user system 1120.

A recipient 1140 may be similarly coupled to cloud 1102 to access data stored by another user.

In some embodiments a user system, such as user device 1130, may not be configured to run a secure data parser, such as data parser 1122, but instead may access an external data parser that may reside on a network, for example, in data security service 1106 in cloud 1102. Cloud 1102 may include multiple illustrative cloud resources, such as data security service 1106, registration/authentication server 1107, and key storage 1108. The data security service 1106 may be used to perform operations on received data such as parsing, encrypting, and storing data, and may interface with other cloud resources. Registration/authentication server 1107 may be used to register and authenticate users of a secure storage system. Various functions of the reg/auth server 1107 are described in further detail below. Key storage 1108 may comprise one or more servers or other storage devices used to store keys such as shared keys or workgroup keys external to user system and in a different physical location from where the data is stored. A user device or user system may access these keys by communicating directly with the key storage 1108 or through the data security service 1106. Cloud 1102 also has n networked storage devices 1104a through 1104n. The cloud resources may be provided by a plurality of cloud resource providers, e.g., Amazon, Google, or Dropbox. These cloud computing resources are merely illustrative, and any suitable number and type of cloud computing resources may be accessible from user systems 1120 and 1130.

Registration/authentication server 1107 may include one or more processors configured to register users of a secure storage system such as user of secure data parser 1122, users of data security service 1106, and recipient users 1140 (which may also be users of data security service 1106). The users may include individual users, user devices, and groups of users or devices. The reg/auth server 1107 may be further configured to store user credentials such as e-mail addresses or usernames, authenticate users (e.g., based on the stored credentials), look up users by their e-mail address or other credentials, transmit a public key to a cryptographic sharing client, de-authorize one or more users from accessing the registration/authentication server 1107. The registration authentication server 1107 may also direct users or user devices to one or more of the storage locations 1104 for writing data or for retrieving data. In particular, if data that a user device requests to retrieve has been parsed in accordance with an M of N technique (one in which M shares of N shares are needed to reassemble or restore a data set to its original or useable form, with M less than N), the registration authentication server 1107 may identify and return to the user device information about M recommended storage locations from among the storage locations 1104a-1104n. The user device can then use this information to selectively access storage locations to retrieve the desired data.

Cloud 1102 and one or more user devices or systems, such as user system 1120, may be in communication with a second cloud 1112. Cloud 1112 includes a plurality of storage devices 1114a-1114n and may include any other cloud resources, such as the cloud resources described in relation to cloud 1102. In some embodiments, Cloud 1102 may be a public cloud (such as Amazon, Google, or Dropbox), and cloud 1112 may be a private cloud, or vice versa. In other embodiments, cloud 1102 and cloud 1112 may be different public clouds (e.g., Cloud 1102 may be provided by Amazon and Cloud 1112 may be provided by Google). Storing data shares and/or key shares across different clouds may provide enhanced data security. In addition to storing data in the cloud, one or more data shares, key shares, or keys may be stored on local storage, such as local memory 1124 of user system 1120 or a local memory of user device 1130, and one or more data shares, key shares, or keys may be stored on removable storage (e.g., a USB memory), such as removable storage 1126 or removable storage 1136 which may be for example. Any suitable number of clouds can be used. For example, in some embodiments, Cloud 1102 and cloud 1112 may form a single cloud, or only one of clouds 1102 and 1112 may be used. In some embodiments, three or more clouds may be used.

The removable storage 1126 or 1136 may be, for example, a compact USB flash drive, a floppy disk, an optical disk, or a smart card. In some embodiments, removable storage 1126 or 1136 may be used to authenticate the identity of a remote user who wishes to view, encrypt, or decrypt data that is managed by data security service 1106. In some embodiments, removable storage 1126 or 1136 may be required to initiate the encryption, decryption, or parsing of data by data security service 1106. In such embodiments, the removable storage 1126 or 1136 may be considered a physical token. An authorized recipient 1140 may also access removable storage configured to authenticate the recipient user so that the recipient 1140 can retrieve and decrypt data which it is authorized to access.

One advantage of cloud Computing is that a user (e.g., a user of user device 1130 or user in 1120) may be able to access multiple cloud computing resources without having to invest in dedicated storage hardware. The user may have the ability to dynamically control the number and type of cloud computing resources accessible to it. For example, user device 1130 or user system 1120 may be provided with on-demand storage resources in the cloud having capacities that are dynamically adjustable based on current needs. In some embodiments, one or more software applications, such as secure data parser 1122 executed on user system 1120 or an Internet web browser on user device 1130, may couple a user to cloud resources 1102. The coupling of cloud resources 1102 to user device 1130 or user system 1120 may be transparent to users such that cloud resources 1102 appear to users as local hardware resources and/or dedicated hardware resources.

Figure 12:
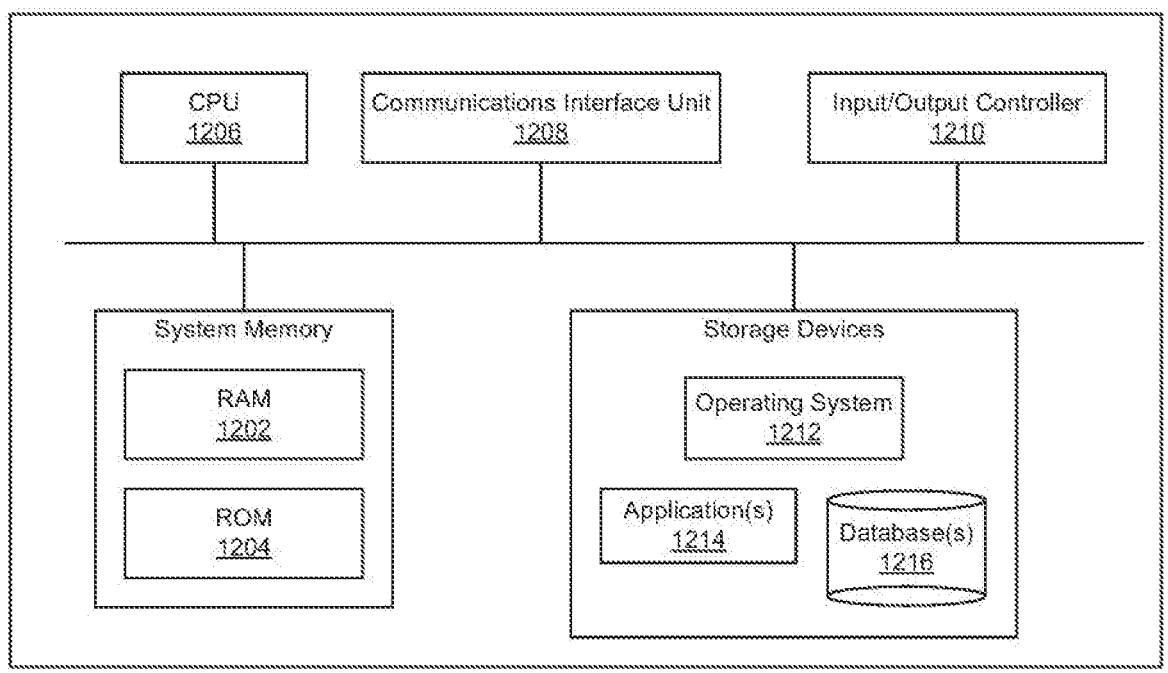
FIG. 12 is a block diagram of a computing device for performing any of the processes described herein.

FIG. 12 is a block diagram of a computing device for performing any of the processes described herein. Each of the components of these systems may be implemented on one or more computing devices 1200. In certain aspects, a plurality of the components of these systems may be included within one computing device 1200. In certain implementations, a component and a storage device may be implemented across several computing devices 1200.

The computing device 1200 comprises at least one communications interface unit an input output controller 1210, system memory, and one or more data storage devices. The system memory includes at least one random access memory (RAM 1202) and at least one read-only memory (ROM 1204). All of these elements are in communication with a central processing unit (CPU 1206) to facilitate the operation of the computing device 1200. The computing device 1200 may be configured in many different ways. For example, the computing device 1200 may be a conventional standalone computer or alternatively, the functions of computing device 1200 may be distributed across multiple computer systems and architectures. In FIG. 12, the computing device 1200 is linked, via network or local network, to other servers or systems.

The computing device 1200 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1208 to a communications hub or port (not shown) that serves as a primary communication link with other servers, client or user computers and other related devices. The communications hub or port may have minimal processing capability itself, serving, primarily as a communications router. A variety of communications protocols may be part of the system, including, but not limited to: Ethernet, SAP, SAS™, ATP, BLUETOOTH™, GSM and TCP/IP.

The CPU 1206 comprises a processor, such as one or more conventional microprocessors and one or more supplementary co-processors such as math co-processors for off-loading workload from the CPU 1206. The CPU 1206 is in communication with the communications interface unit 1208 and the input/output controller 1210, through which the CPU 1206 communicates with other devices such as other servers, user terminals, or devices. The communications interface unit 1208 and the input/output controller 1210 may include multiple communication channels for simultaneous communication with, for example, other processors, servers or client terminals. The processors can include any combination of hardware and software processors. Hardware processors include processing circuitry, which may include any combination of digital circuits, integrated circuits, ASICs, microchips, and the like. The processors are in communication with one or more non-transient computer-readable memory units, which may be local or remote to the processors.

The CPU 1206 is also in communication with the data storage device. The data storage device may comprise an appropriate combination of magnetic, optical or semiconductor memory, and may include, for example, RAM 1202, ROM 1204, flash drive, an optical disc such as a compact disc or a hard disk or drive. The CPU 1206 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1206 may be connected to the data storage device via the communications interface unit 1208. The CPU 1206 may be configured to perform one or more particular processing functions.

The data storage device may store, for example, (i) an operating system 1212 for the computing device 1200; (ii) one or more applications 1214 (e.g., computer program code or a computer program product) adapted to direct the CPU 1206 in accordance with the systems and methods described here, and particularly in accordance with the processes described in detail with regard to the CPU 1206; or (iii) database(s) 1216 adapted, to store information that may be utilized to store information required by the program.

The operating system 1212 and applications 1214 may be stored, for example, in a compressed, an uncompiled and an encrypted format, and may include computer program code. The instructions of the program may be read into a main memory of the processor from a computer-readable medium other than the data storage device, such as from the ROM 1204 or from the RAM 1202. While execution of sequences of instructions in the program causes the CPU 1206 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to vehicle routing and motion planning as described herein. The program also may include program elements such as an operating system 1212, a database management system and "device drivers" that allow the processor to interface with computer peripheral devices (e.g., a video display, a keyboard, a computer mouse, etc.) via the input/output controller 1210.

The term "computer-readable medium" as used herein refers to any non-transitory medium that provides or participates in providing instructions to the processor of the computing device 1200 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1206 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1200 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

The secure data parsing techniques described herein may be applied to data access using virtual machines, and in particular, to communication between a virtual machine and one or more servers, or end users. Systems and methods for providing additional security features within virtual machine computing environments that integrate virtual machine and host machine security operations are described in detail in U.S. patent application Ser. No. 13/212,360, filed Aug. 18, 2011, which is hereby incorporated herein by reference in its entirety.

Any of the above described systems and methods may be implemented using a cryptographic file splitting layer that intercepts data to be stored on a file system and modifies at least some of the intercepted data, e.g., by securing data being stored in the file system, or by restoring secured data retrieved from the file system. According to one aspect, the cryptographic file system layer intercepts data passing between the application layer and the file system and modifies only data that is located in one or more designated directories. If a file is in a designated directory, it is modified before being stored, which provides increased security for that file; if the file is not in a designated directory, it is not modified. Retrieved files in a designated directory are also modified in order to reverse the modification that the cryptographic file system layer performed before the file was stored.

FIG. 13 is a block diagram showing the arrangement of several software layers including a cryptographic file system layer. As shown in FIG. 13, the cryptographic file system layer sits below an application layer and on top of a virtual file system (VFS) referred to in some embodiments (e.g., Windows) as an installable file system. A VFS is an abstraction layer on top of the file system that allows applications to access different types of file systems. The VFS allows applications to use a common set of calls to access multiple file systems. The VFS and the cryptographic file system layer may be within the kernel layer. Because the cryptographic file system layer sits between the application layer and the VFS layer, calls from the application layer to the file system via the VFS also pass through the cryptographic file system layer, which allows the cryptographic file system to intercept and modify data that is passed from the application layer to the file system, or from the file system to the application layer.

The cryptographic file system layer can perform one or more modifications or operations on files. For example, the cryptographic system layer can perform one or any combination of encryption, single-factor data splitting, multi-factor data splitting, adding threshold properties to the splitting process (e.g., creating an M of N split and specifying that M is the threshold of data shares needed to restore the data), and authentication. The cryptographic file system layer may perform the selected modifications on all files or on the files located in the designated directory or designated directories.

In some embodiments, the cryptographic file system layer is transparent to the user. Files and directories stored on the mount point are directly visible, and the cryptographic file system layer may maintains data describing the files and the directories (e.g., mode statistics, ownership, and security descriptions). The file system may have the same look and feel to the user as that it would were the cryptographic file system not installed. For example, if the cryptograph file system layer modifies a file by splitting it into multiple pieces, the file still appears as a single file to the user. As another example, if a modification of the cryptographic file system increases the size of the file stored on the system, the size of the file before the modification is shown to the user.

In some implementations, the cryptographic file system layer includes the following four components:

1. Data identifying the designated directory locations for which files in these directory locations (including subdirectories) should be modified.

2. A background module that processes files in the designated directory locations that have not yet been intercepted by the cryptographic file system layer and, thus, have not yet been modified.

3. An active module that processes files in the designated directory locations that are intercepted by the cryptographic file system layer.

4. A compliance module that reports on the progress of the data modification. The compliance module may report the progress of modification against the total desired target (e.g., a percentage of the number of files that have been modified against the number of files in the designated directory, or a percentage of the total size of the files that have been modified against the total size of the files in the designated directory) and can output a report providing information on the progress of the modification.

These components are described further below, with reference to FIG. 14-65.

Installation and Configuration of Cryptographic File System Layer

The installation, configuration, and operation of the cryptographic file system layer are designed preferably (though not necessarily) to be transparent to the user and to have minimal impact on the user and system operation. The cryptographic file system layer may be installed and configured on a server, a virtual machine, or on another computing system without requiring a reboot or restart. In some embodiments, the installation and configuration of a cryptographic file system involves little or no intervention on the part of a user or administrator, and installation and configuration do not disrupt the operation of programs running on the computing system or virtual machine. In some embodiments, the installation and operation of the cryptographic file system layer does not change any of the drive mapping or drive naming, and need not involve the creation or use of additional mount points. Specifics of certain embodiments of the installation and configuration processes are described below.

Installation

The cryptographic file system may be installed following a user install command or may be installed automatically. In some embodiments, installation requires no user input or intervention; in other cases, the user may take some action that triggers installation of the cryptographic file system layer, and no further input is required. For example, a user may download software for the cryptographic file system layer that may install automatically, or a user may install software other than the cryptographic file system that triggers the installation of a cryptograph is file system layer. In another example, a user, group, or company may have cryptographic file system layer automatically installed on some or all devices that are associated with or become associated with the user, group, or company.

In some embodiments, the cryptographic file system layer can be installed on a virtual machine. In this case, a pre-defined virtual machine configuration may trigger the installation at the cryptographic file system layer when a new virtual machine is created. Alternatively, installation of the cryptographic file system layer may be triggered when a particular program is opened or other action is taken by or in a virtual machine.

The installation process may create a default configuration file that contains installation information. Further information on the configuration file and making changes to the configuration file are discussed below.

Designating Directories

Before, during, or after configuration, the user or art administrator can designate one or more directories. In addition, in some embodiments, one or more directories are designated automatically. Files in each designated directory will be intercepted and modified by the cryptographic file system layer; files in other directories will pass through the cryptographic file system layer without modification. In some embodiments, designated directories can be directories that were created before the cryptographic file system layer has been installed and configured. This allows the cryptographic file system layer to modify existing files without requiring modification of the directory locations of the existing files. In further embodiments, directory locations that are empty can be designated as designated directories. In this case, the cryptographic file system layer will automatically modify any new files that are added to the designated directory. New designated directories can also be added after the cryptographic file system layer has been configured. Thus, the designated directory list can be dynamically modified before and during operation of the cryptographic file system layer. In some embodiments, content can be designated in other ways, such as designated particular files, using file extensions that designate files, or using other attribute-based criteria to designate content to be modified.

Configuration

The cryptographic splitting system layer can be configured using any number of configuration approaches. In one implementation, various options for the cryptographic file system layer are set in a configuration file. The configuration file may indicate, for example, the type of modification(s) to be performed, one or more storage locations used for storing split files, and the designated directories. A default configuration may be provided. This default configuration may be selected by the cryptographic file system layer developer, or it may be based on user information, group or company preferences, information or preferences indicated by other software, system configuration or requirements, or any other information. As mentioned above, the default configuration file may be created during installation.

The user or an administrator may customize one or more aspects of the configuration. Customizations for the configuration may be received using, for example, an HTML based interactive question and answer mode, of a command line configuration procedure. The operator performing the configuration may receive the default configuration settings and customize the settings as desired during configuration. Some of the configuration aspects may be changed after the initial configuration, such as the list of designated directories. These configuration aspects may be modified using an HTML based interactive mode, a command line mode, or a text editor mode for example. Other configuration aspects, such as the modification or set of modifications performed on files, may not be able to be modified.

During the configuration, the cryptographic file system layer may generate a default server key and provides a default installation location for the key store protected by the server key. The server key protects a workgroup key store in some embodiments that use a tiered key system. In some tiered systems, a server key protects a workgroup key store containing external workgroup keys, and each external workgroup key protects internal keys used to encrypt and/or split each data file. In some embodiments, multiple servers may act on the same data, and may each need to access the workgroup keys. In such embodiments, each server is given a server key so that it can access the workgroup key store. In some embodiments, the location of the server key can be moved after initial configuration, and/or a new server key can be created and assigned a location.

Operation of Cryptographic File System Layer
Types of Modifications

The cryptographic file system layer may be configured to perform one or more types of modifications. These modifications may include one or more of encryption, data shuffling, single-factor data splitting, multi-factor data splitting, adding threshold properties to the splitting process (e.g., creating an M of N split, where M is the threshold of shares needed to restore the data), and authentication. Examples of these types of operations are described above. The original data can be restored from the modified data using any of the restoration operations described herein.

The cryptographic file system layer may be configured to perform some or all of the above-mentioned modifications, and may perform one or more additional or alternative types of modification. For example, the cryptographic file system layer may encrypt data, or encrypt and authenticate data, or scramble and authenticate data. Each of these modifications results in a single modified data file. As another example, the cryptographic file system layer may split the data into several shares and authenticate each share, resulting in multiple modified files. When the modification results in only a single file, the resulting modified file may be stored in the same location in the file system that the file would have been stored in in the absence of a cryptographic file system layer. When the modify results in multiple files (e.g., multiple data shares), one or more of the resulting modified files are stored in a different location from the location M the file system that the file would have been stored in in the absence of a cryptographic file system layer. The steps taken when reading and writing files via the cryptographic file system layer are described below.

In some embodiments, if a stored file is edited, the cryptographic file system layer retrieves the entire file, reverses the modification, and makes the edit to unmodified file. In other embodiments, the edit can be modified and stored without needing to reverse the modification and/or retrieve the entire file. For example, a piece of the file being edited could be retrieved, reverse modified, edited, modified, and stored.

Write Commands

Figure 14:
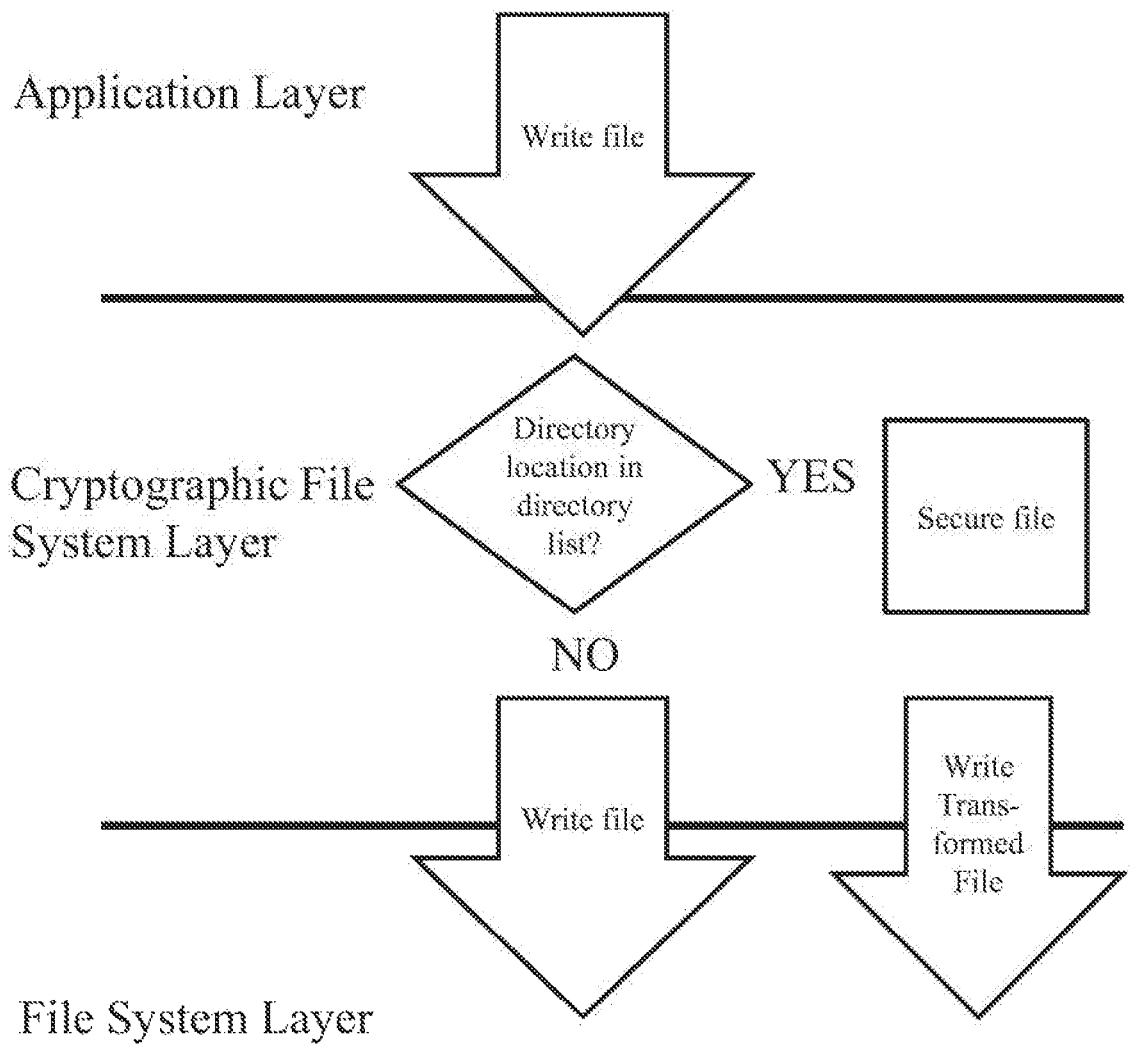
FIG. 14 is a schematic diagram showing illustrative interactions among the application layer, cryptographic file system layer, and file system layer during a write operation, according to one implementation.

FIG. 14 shows a schematic diagram showing the interaction between the application layer, cryptographic file system layer, and file system layer during a write operation. As discussed above, there may be a virtual file system layer or installable file system layer between the cryptographic file system layer and the file system layer; this layer is not shown in FIG. 14. In FIG. 14, the application layer sends a write file command that passes through the cryptographic file system layer. The cryptographic file system layer, which stores a list of designated directories, compares the directory location for the file involved in the write file command to the directories in the list of designated directories to determine whether the file being written is in a designated directory or a subdirectory of a designated directory.

If the file being written is not in the list of designated directories, the write file command is passed to the file system layer, which carries out the write command. If the file being written is in the list of designated directories, the cryptographic file system layer secures the file based on one or more modifications, as specified by the configuration file. In the example shown in FIG. 14, a single file is modified to a single file, and the modification does not involve splitting the file into multiple shares. The write file command for the modified file is then sent to the file system layer. The file system layer may not know that the file has been modified, and simply stores the modified file in the same manner that it stores unmodified files.

Figure 15:
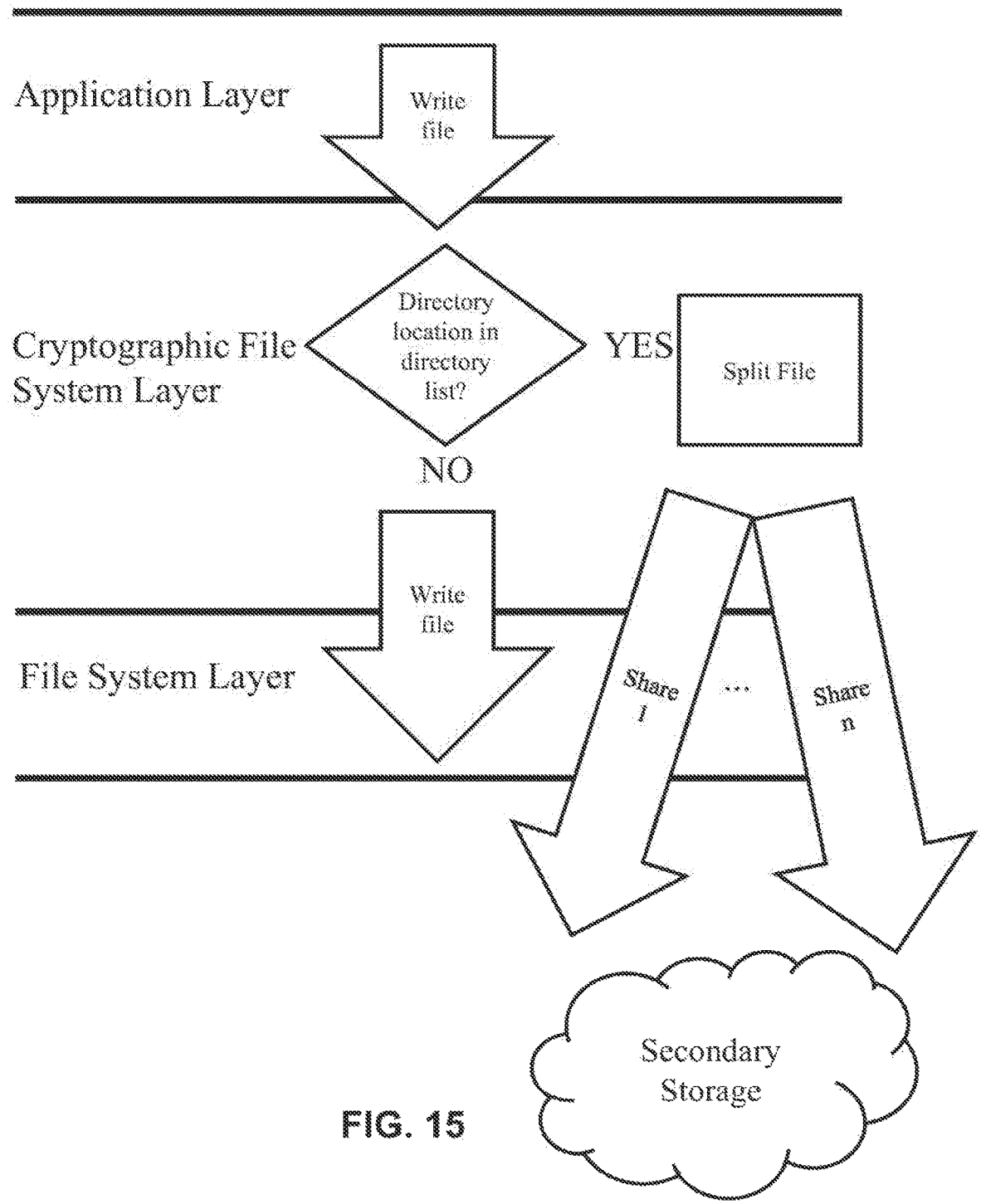
FIG. 15 is a schematic diagram showing illustrative interactions among the application layer, cryptographic file system layer, and file system layer during a write operation in which a file is split into multiple shares, according to one implementation.

FIG. 15 shows another schematic diagram showing the interaction between the application layer, cryptographic file system layer, and file system layer during a write operation. In the example of FIG. 15, the configuration file specifies that the modification involves splitting the file, e.g., using an N of N split (N of N shares are needed to restore the data), or an M of N split (M of N shares are needed to restore the data, M<N). The processes of determining whether a file is in a designated directory and writing a file that is not in a designated directory are the same as described in relation to FIG. 14. However, the securing process is different from FIG. 14; in FIG. 15, the securing process results in a plurality of shares 1 through n that are stored outside of the file system. For example, in FIG. 15, shares 1 through n are stored in secondary storage, which may, for example, be in a cloud. In some embodiments, one or more shares are stored in the file system. For example, one of the shares may be stored in the file system, and the remaining shares may be stored in a secondary storage location.

Read Commands

Figure 16:
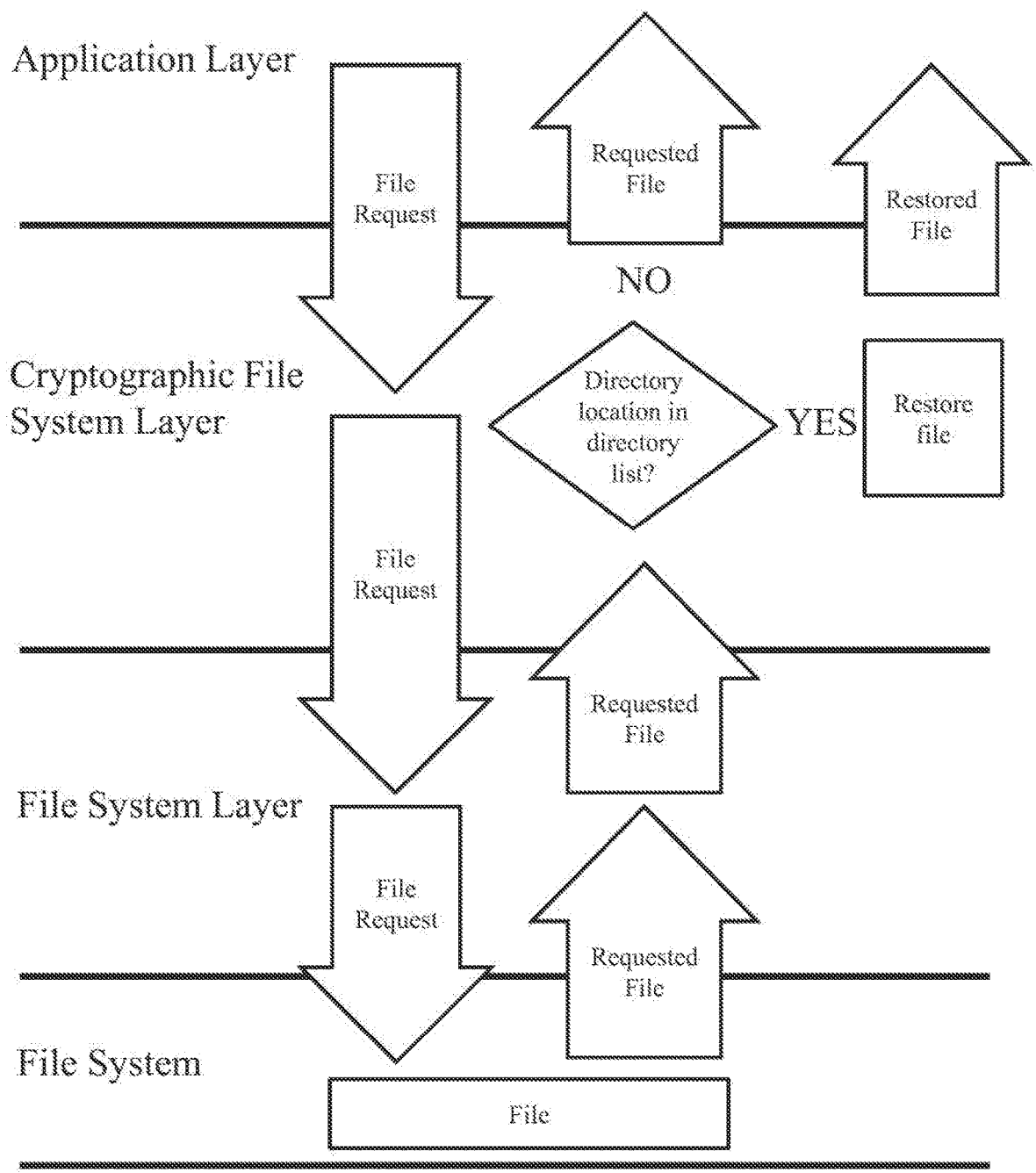
FIG. 16 is a schematic diagram showing illustrative interaction among the application layer, cryptographic file system layer, and file system layer during a read operation, according to one implementation.

FIG. 16 shows a schematic diagram showing the interaction between the application layer, cryptographic file system layer, file system layer, and file system during a read operation. As in FIGS. 14 and 15, the virtual file system layer or installable file system layer, if present, is not depicted. In the example of FIG. 16, the cryptographic file system layer is configured to modify the file into a single file as shown in FIG. 14; the cryptographic file system layer modifies and stores each file as a single file in the same location on the file system that it would have been stored had it not been modified. In this case, the file read request passes through the cryptographic file system layer to the file system layer, which retrieves the file from the file system. When the requested file passes back through the cryptographic file system layer, the cryptographic file system layer compares the directory location of the requested file to the directories in the list of designated directories to determine whether the requested file is in a designated directory or a subdirectory of a designated directory. If the request file is not in the list of designated directories, the requested file simply passes to the application layer. If the file being written is in the list of designated directories, the cryptographic file system layer restores the original file by reversing the modifications specified by the configuration file. The original file is then passed to the application layer. In other embodiments, the comparing step is performed when the cryptographic file system layer receives the read request and not when the cryptographic file system layer receives the requested file.

Figure 17:
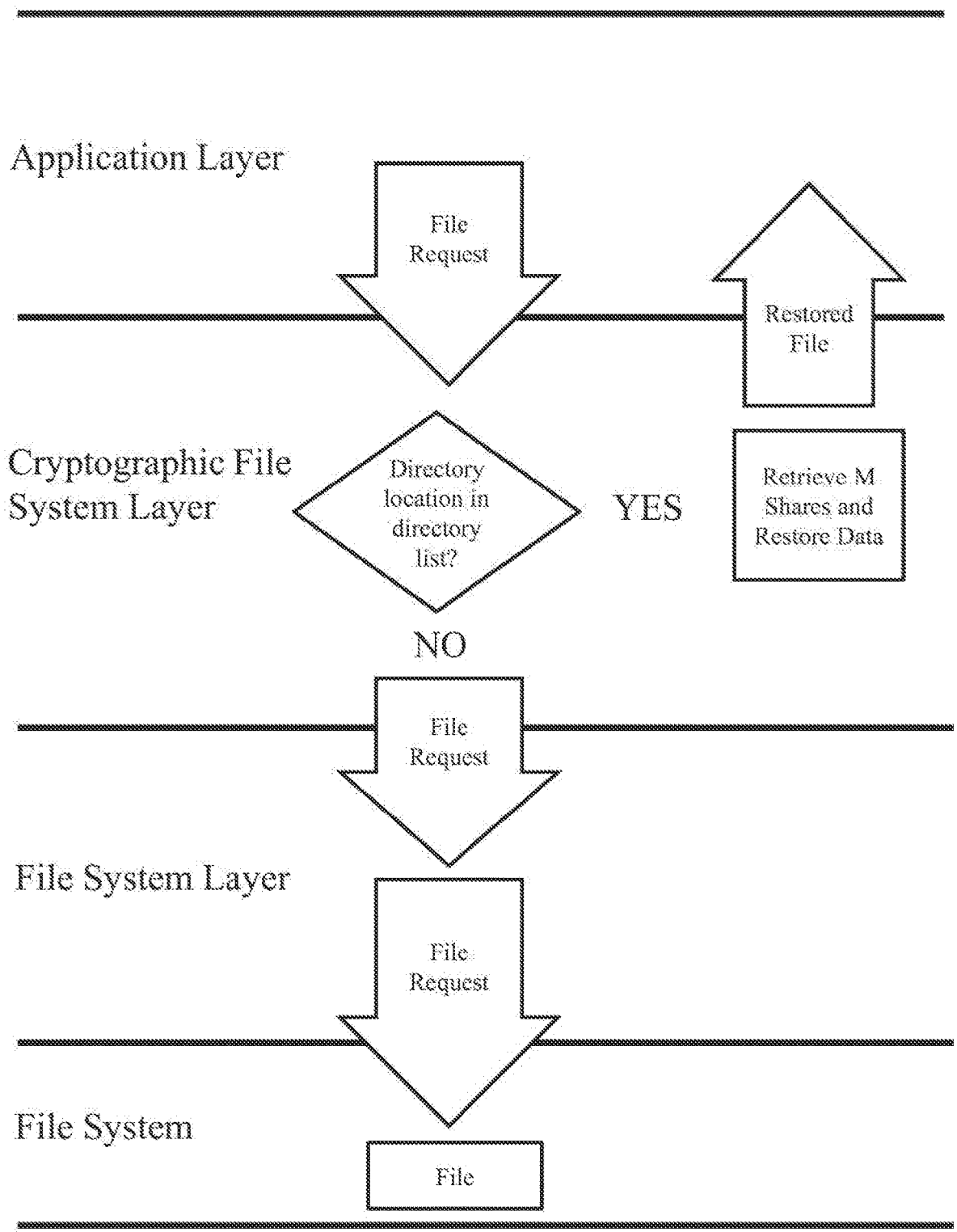
FIG. 17 is a schematic diagram showing illustrative interaction among the application layer, cryptographic file system layer, and file system layer during a read operation of a file that the cryptographic file system layer had split into multiple shares, according to one implementation.

FIG. 17 shows another schematic diagram showing the interaction between the application layer, cryptographic file system layer, and file system layer during a read operation of a file that had been modified in a manner similar to split modification described in relation to FIG. 15. In this case, the cryptographic file system intercepts an incoming file request and compares the directory location of the requested file to the directories in the list of designated directories to determine whether the requested file is in a designated directory or a subdirectory of a designated directory. If the request file is not in the list of designated directories, the requested file simply passes the request to the file system, and the retrieved file is returned to the application layer without thither action by the cryptographic file system layer. If the file being written is in the list of designated directories, the cryptographic file system layer retrieves M shares of the data (where M is the threshold number of shares needed to restore the original data), e.g., from secondary storage, from specified locations in the file system, or from a combination of storage locations. After retrieving M shares, the cryptographic file system layer restores the original file by reversing the modifications specified by the configuration file. The original file is then passed to the application layer.

Background Conversion Process

In some embodiments, after the cryptographic file system layer is configured, if there are files in the designated directory, the files are automatically modified by the background module. The background module also modifies files when new directories already containing files are designated, and when new files are moved into a designated directory.

Figure 18:
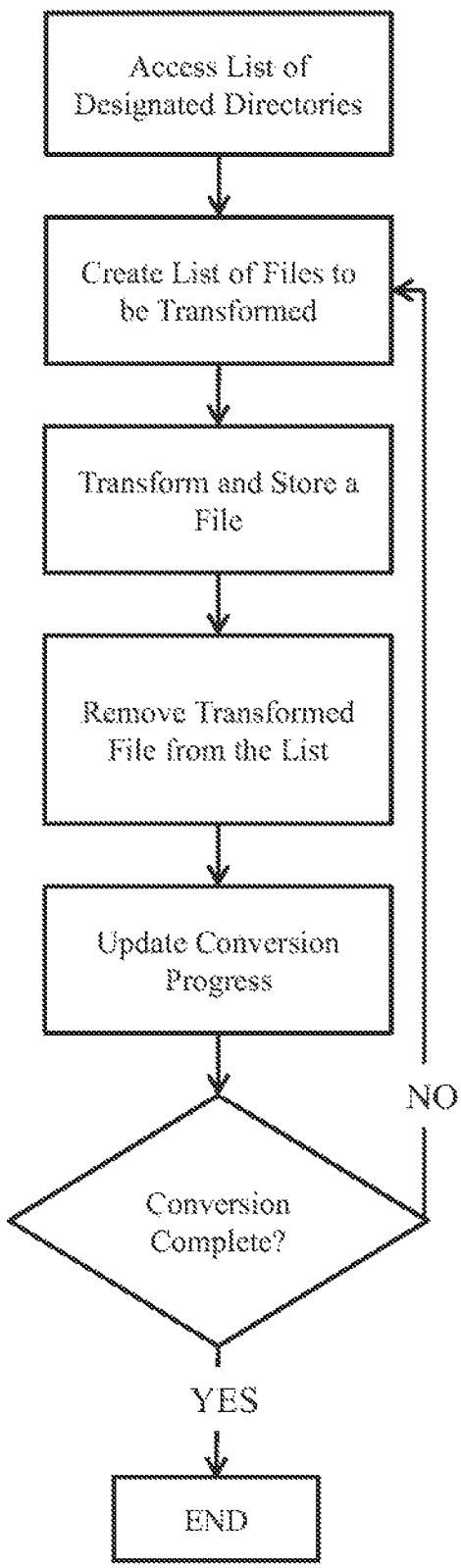
FIG. 18 illustrates a process by which the cryptographic file system layer modifies and stores files in designated directories, according to one implementation.

When the cryptographic file system layer is first configured, it may modify all files in the designated directories. An example of this conversion process is shown in FIG. 18. First, the background module of the cryptographic file system layer accesses the list of designated directories. The background module then identifies all files in the designated directories and creates a list identifying these files. The background layer modifies and stores each file, and the files are removed from the list identifying the files to be modified. Files are modified and stored based on the configuration file, as described in the above description of write commands in relation to FIGS. 14 and 15. In some embodiments, a compliance module tracks the progress of this modification until the conversion is complete. This process is performed whenever files are moved into a designated directory or when new directories are designated.

After a file has been modified, any further I/O operations (e.g., read and write operations discussed above) on that file are monitored by the active module of the cryptographic file system layer. The active and background module may communicate to prevent simultaneous file modification. For example, if the active module tries to retrieve a file that is in the process of being modified, the background module may prevent the active module from accessing that file until the modification is competed. Similarly, if the active module is processing a file, the background module will not operate on that file.

Generalized Active Conversion Process

Figure 19:
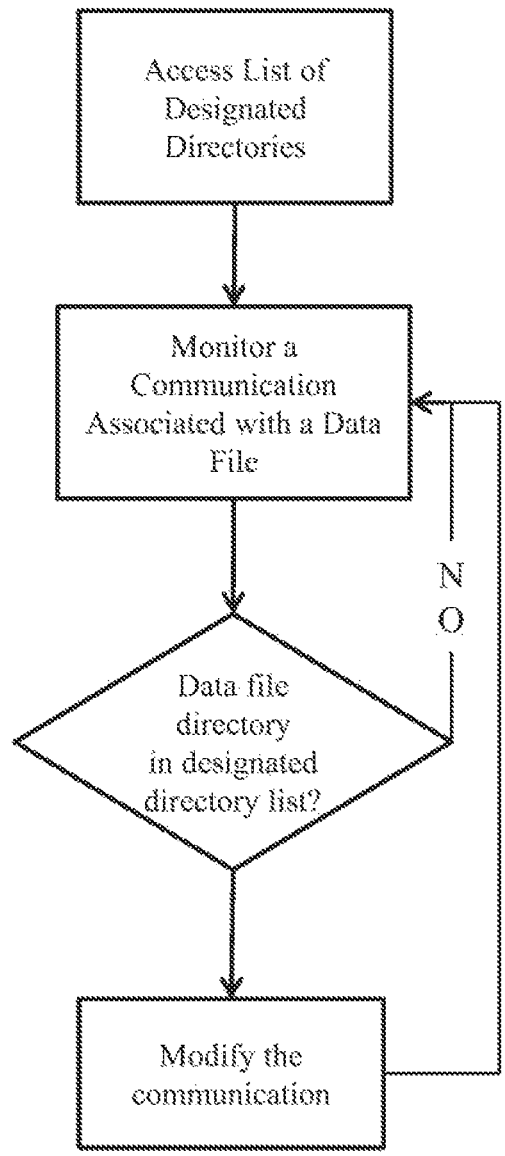
FIG. 19 illustrates a process by which the cryptographic file system layer monitors I/O operations and modifies designated files, according to one implementation.

The conversion process performed by the active module is shown in FIG. 19. This conversion process represents the actions taken when writing, reading, or modifying files, as discussed above. The active module of the cryptographic file system layer first accesses the list of designated directories. The active module then monitors all I/O communications between the application layer and the file system; these communications are associated with data files. The active module determines whether the directory location of the data file associated with the communication is in one of the designated directories or a subdirectory of a designated directory. If not, the active module continues to monitor communications. If the directory location of the data file associated with the communication is in one of the designated directories or a subdirectory of a designated directory, the communication is modified, e.g., by modifying data to be written, or unmodifying data to be read, as described above.

Removing a File from a Designated Directory

In some embodiments, when a file is removed from a designated directory, the cryptographic file system layer reverses the modifications that had been performed on it before storage. The original file is then passed to the VFS and stored without modification. While the file modification is being reversed, the compliance module may report the data modification as being greater than 100% (if, for example, the data modification was at 100% before the file was removed), or the compliance module may not take the data being reverse modified into account when reporting the percent of data modified.

Although some applications of the secure data parser are described above, it should be clearly understood that the present invention may be integrated with any network application in order to increase security, fault-tolerance, anonymity, or any suitable combination of the foregoing.

Additionally, other combinations, additions, substitutions and modifications will be apparent to the skilled artisan in view of the disclosure herein.

What is claimed is:

1. A method for use in a computer system including an application layer, a cryptographic file system layer and a file system layer having one or more first directory locations each designated as a secure directory and one or more second directory locations each not designated as the secure directory, the method comprising:
   receiving a write command to write a data file in the file system layer;
   obtaining a destination directory location associated with the write command;
   determining whether the destination directory location is one of the one or more first directory locations or one of the one or more second directory locations;
   in response to determining that the destination directory location is the one of the one or more first directory locations:
      intercepting the write command by the cryptographic file system layer, wherein the intercepting is transparent to a user of the computer system;
      after intercepting, modifying, by the cryptographic file system layer, the data file to generate a modified data file; and
      storing the modified data file in the destination directory location;
   in response to determining that the destination directory location is the one of the one or more second directory locations:
      storing the data file in the destination directory location.

2. The method of claim 1, wherein the write command is initiated by the application layer and destined for the file system layer when intercepted by the cryptographic file system layer.

3. The method of claim 1, wherein modifying the data file to generate the modified data file includes encrypting the data file to generate an encrypted data file.

4. The method of claim 1, wherein modifying the data file to generate the modified data file includes adding redundant bits to the data file.

5. The method of claim 1, wherein modifying the data file to generate the modified data file includes splitting the data file into a plurality of data file portions.

6. The method of claim 5, wherein modifying the data file to generate the modified data file includes encrypting each of the plurality of data file portions to generate a plurality of encrypted data file portions.

7. The method of claim 6, wherein storing the modified data file in the destination directory location includes sending one of the plurality of encrypted data file portions to a geographically dispersed location.

8. A method for use in a computer system including an application layer, a cryptographic file system layer and a file system layer having one or more first directory locations each designated as a secure directory and one or more second directory locations each not designated as the secure directory, the method comprising:
   receiving a read command to read a data file stored in the file system layer;
   obtaining a destination directory location associated with the read command;
   determining whether the destination directory location is one of the one or more first directory locations or one of the one or more second directory locations;
   in response to determining that the destination directory location is the one of the one or more first directory locations:
      intercepting the read command by the cryptographic file system layer, wherein the intercepting is transparent to a user of the computer system;
      after intercepting, retrieving a modified data file from the destination directory location;
      modifying, by the cryptographic file system layer, the modified data file to generate the data file; and
   in response to determining that the destination directory location is the one of the one or more second directory locations:
      retrieving the data file from the destination directory location.

9. The method of claim 8, wherein the read command is initiated by the application layer and destined for the file system layer when intercepted by the cryptographic file system layer.

10. The method of claim 8, wherein modifying the modified data file to generate the data file includes decrypting the modified data file.

11. The method of claim 8, wherein modifying the modified data file to generate the data file includes removing redundant bits from the modified data file.

12. The method of claim 8, wherein retrieving the modified data file includes retrieving a plurality of data file portions, and modifying the modified data file to generate the data file includes assembling the plurality of data file portions into the data file.

13. The method of claim 12, wherein modifying the modified data file to generate the data file includes decrypting each of the plurality of data file portions to generate a plurality of decrypted data file portions.

14. The method of claim 12, wherein retrieving the modified data file in the destination directory location includes receiving one of the plurality of data file portions from a geographically dispersed location.

15. A computer system comprising:
   a processor;
   an application layer;
   a cryptographic file system layer; and
   a file system layer having one or more first directory locations each designated as a secure directory and one or more second directory locations each not designated as the secure directory;
   the processor configured to:
      receive a write command to write a data file in the file system layer;
      obtain a destination directory location associated with the write command;
      determine whether the destination directory location is one of the one or more first directory locations or one of the one or more second directory locations;
      in response to determining that the destination directory location is the one of the one or more first directory locations:
         intercept the write command by the cryptographic file system layer, wherein the intercepting is transparent to a user of the computer system;
         after intercepting, modify, by the cryptographic file system layer, the data file to generate a modified data file; and store the modified data file in the destination directory location;
in response to determining that the destination directory location is the one of the one or more second directory locations:
store the data file in the destination directory location.

16. The computer system of claim 15, wherein the write command is initiated by the application layer and destined for the file system layer when intercepted by the cryptographic file system layer.

17. The computer system of claim 15, wherein modifying the data file to generate the modified data file includes encrypting the data file to generate an encrypted data file.

18. The computer system of claim 15, wherein modifying the data file to generate the modified data file includes adding redundant bits to the data file.

19. The computer system of claim 15, wherein modifying the data file to generate the modified data file includes splitting the data file into a plurality of data file portions and encrypting each of the plurality of data file portions to generate a plurality of encrypted data file portions, and wherein storing the modified data file in the destination directory location includes sending one of the plurality of encrypted data file portions to a geographically dispersed location.

20. The computer system of claim 15, wherein the processor is further configured to:
receive a read command to read the data file in the file system layer;
obtain the destination directory location associated with the read command;
determining whether the destination directory location is the one of the one or more first directory locations or the one of the one or more second directory locations;
in response to determining that the destination directory location is the one of the one or more first directory locations:
intercepting the read command by the cryptographic file system layer, wherein the intercepting is transparent to the user of the computer system;
after intercepting, retrieving the modified data file from the destination directory location;
modifying, by the cryptographic file system layer, the modified data file to generate the data file; and
in response to determining that the destination directory location is the one of the one or more second directory locations:
retrieving the data file from the destination directory location.

* * * * *